(12) United States Patent
Arakane et al.

(10) Patent No.: US 11,663,432 B2
(45) Date of Patent: May 30, 2023

(54) PRINTER, NON-TRANSITORY STORAGE MEDIUM STORING PLURALITY OF INSTRUCTIONS, AND CONTROL METHOD

(71) Applicant: BROTHER KOGYO KABUSHIKI KAISHA, Nagoya (JP)

(72) Inventors: Satoru Arakane, Nagoya (JP); Tsuyoshi Ito, Nagoya (JP); Masao Mimoto, Kitanagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 16 days.

(21) Appl. No.: 17/375,130

(22) Filed: Jul. 14, 2021

(65) Prior Publication Data
US 2022/0016900 A1    Jan. 20, 2022

(30) Foreign Application Priority Data
Jul. 20, 2020    (JP) .............................. JP2020-123790

(51) Int. Cl.
G06K 15/02    (2006.01)

(52) U.S. Cl.
CPC .............................. G06K 15/1877 (2013.01)

(58) Field of Classification Search
CPC .................................................. G06K 15/1877
See application file for complete search history.

(56) References Cited

U.S. PATENT DOCUMENTS

| | | | |
|---|---|---|---|
| 6,002,844 A | 12/1999 | Kishida et al. | |
| 2005/0122354 A1 | 6/2005 | Yamane et al. | |
| 2017/0286737 A1 | 10/2017 | Ozawa | |
| 2018/0213125 A1 | 7/2018 | Takeuchi et al. | |

FOREIGN PATENT DOCUMENTS

| | | | | |
|---|---|---|---|---|
| JP | H10-55401 A | 2/1998 | | |
| JP | 2005-169628 A | 6/2005 | | |
| JP | 2006-330906 A | 12/2006 | | |
| JP | 2014-113708 A | 6/2014 | | |
| JP | 2017-182455 A | 10/2017 | | |
| JP | 2018052088 A | * 4/2018 | ............. | B41J 2/505 |
| JP | 2018-118382 A | 8/2018 | | |

* cited by examiner

*Primary Examiner* — Julian D Huffman
(74) *Attorney, Agent, or Firm* — Scully, Scott, Murphy & Presser, PC

(57) ABSTRACT

A printer includes a printing device including a print head, a first moving device, and a second moving device, and a controller. The controller is configured to generate first partial-dot-data by executing a first generating process with respect to first partial-image data and generate second partial-dot-data by executing a second generating process with respect to second partial-image-data. In the second generating process, the controller determines a degree of reduction in density by the second generating process to a first degree of reduction in a first case where a particular condition including a code condition that is satisfied when the second partial-image includes at least a portion of a code image is satisfied, and determine the degree of reduction in density by the second generating process to a second degree different from the first degree of reduction when the second partial-image does not include the code image.

13 Claims, 15 Drawing Sheets

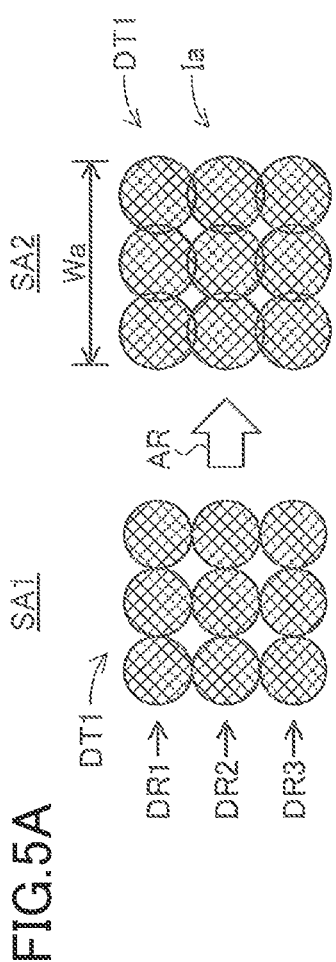
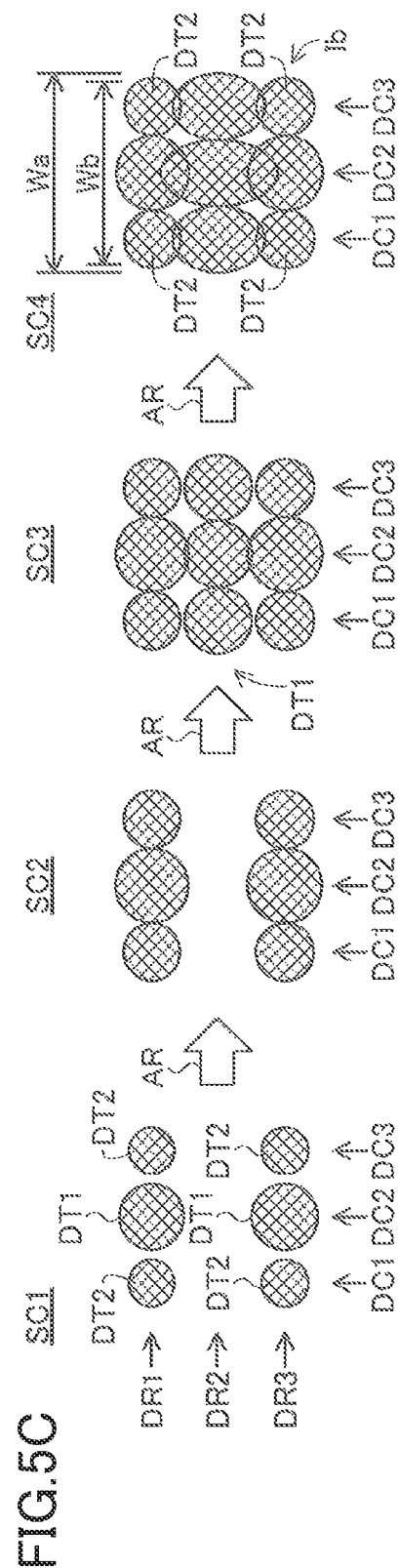

PRINTER, NON-TRANSITORY STORAGE MEDIUM STORING PLURALITY OF INSTRUCTIONS, AND CONTROL METHOD

CROSS REFERENCE TO RELATED APPLICATION

The present application claims priority from Japanese Patent Application No. 2020-123790, which was filed on Jul. 20, 2020, the disclosure of which is herein incorporated by reference in its entirety.

BACKGROUND

The following disclosure relates to a technique of controlling a printer.

A conventional printer executes printing on a printing medium by a plurality of times of passes. Joint regions of a part of the printing medium close to a boundary of bands are printed by two passes, and other regions except for the joint regions are printed by one pass. A color conversion process for converting RGB data into data of a CMYK color space is executed for printing. A lookup table used for the color conversion process of the joint region printed by two passes differs from a lookup table used for the color conversion process of a normal region printed by one pass. This configuration enables color unevenness generated between the normal region and the joint region to be reduced.

SUMMARY

The printer executes printing of various images. For example, code images representing information such as numerals, characters, and signs can be printed. As the code images, one-dimensional codes such as a barcode and two-dimensional codes such as a QR code (registered trademark) can be printed. When color values used for printing are adjusted by considering colors to be printed, density of the code image to be printed improperly changes. If the density of the printed code image is improper, it can be difficult to read information represented by the code image.

The present disclosure discloses a technique of properly printing the code image.

In one aspect of the disclosure, a printer includes a printing device including a print head having a plurality of nozzles arranged in a first direction and configured to discharge ink, a first moving device configured to execute main scanning of moving the print head relatively with respect to a printing medium in a second direction intersecting the first direction, and a second moving device configured to execute sub scanning of moving the printing medium relatively with respect to the print head in the first direction, and a controller configured to obtain object image data of an object image including a code image having a first area and a second area, brightness of which is different from brightness of the first area, the code image representing information by the first area and the second area, specify the code image included in the object image, generate dot data, by using the object image data, in which each of a plurality of pixels has information representing dot forming states of the ink, and control the printing device to execute partial printing and the main scanning a plurality of times respectively so as to print the object image on the printing medium, the partial printing being printing in which a plurality of dots are formed on the printing medium based on the dot data by discharging the ink from the print head while the main scanning is executed. A plurality of print target areas includes a first print target area and a second print target area which are two print target areas adjacent to each other in the first direction and overlapping to each other, the plurality of print target areas respectively corresponding to the plurality of times of the partial printing on the printing medium. The controller is configured to generate first partial-dot-data of the dot data by executing a first generating process with respect to first partial-image data of the object image data, the first partial-image-data corresponding to a first partial-image that is an image positioned within a non-overlapping area that is an area except for an overlapping area in a total area of the first print target area and the second print target area, the overlapping area being an area where the first print target area and the second print target area overlap to each other, and generate second partial-dot-data of the dot data by executing a second generating process with respect to second partial-image-data of the object image data, the second partial-image-data corresponding to a second partial-image that is an image positioned within the overlapping area, the second generating process being a process of generating the second partial-dot-data such that density of the second partial-image represented by partial-dot-data generated when the second generating process is executed to the second partial-image data is equal to or less than density of a partial image represented by partial-dot-data generated when the first generating process is executed to the second partial-image data. In the second generating process, the controller is configured to determine a degree of reduction in density by the second generating process to a first degree of reduction in a first case where a particular condition including a code condition that is satisfied when the second partial-image includes at least a portion of the code image is satisfied, and determine the degree of reduction in density by the second generating process to a second degree of reduction that is different from the first degree of reduction in a case where the second partial-image does not include the code image.

In another aspect of the disclosure, a non-transitory storage medium stores a plurality of instructions readable by a computer of a printer. The printer includes a print head having a plurality of nozzles arranged in a first direction and configured to discharge ink, a first moving device configured to execute main scanning of moving the print head relatively with respect to a printing medium in a second direction intersecting the first direction, and a second moving device configured to execute sub scanning of moving the printing medium relatively with respect to the print head in the first direction. When executed by the computer, the plurality of instructions cause the printer to obtain object image data of an object image including a code image having a first area and a second area, brightness of which is different from brightness of the first area, the code image representing information by the first area and the second area, specify the code image included in the object image, generate dot data, by using the object image data, in which each of a plurality of pixels has information representing dot forming states of the ink, and control the printing device to execute partial printing and the main scanning a plurality of times respectively so as to print the object image on the printing medium, the partial printing being printing in which a plurality of dots are formed on the printing medium based on the dot data by discharging the ink from the print head while the main scanning is executed. A plurality of print target areas includes a first print target area and a second print target area which are two print target areas adjacent to each other in the first direction and overlapping to each other, the plurality of print target areas respectively corresponding to the plurality of times of the partial printing on the printing medium. When executed by the computer, the plurality of instructions cause the printer to generate first partial-dot-data of the dot data by executing a first generating process with respect to first partial-image data of the object image data, the first partial-image-data corresponding to a first partial-image that is an image positioned within a non-overlapping area that is an area except for an overlapping area in a total area of the first print target area and the second print target area, the overlapping area being an area where the first print target area and the second print target area overlap to each other, and generate second partial-dot-data of the dot data by executing a second generating process with respect to second partial-image-data of the object image data, the second partial-image-data corresponding to a second partial-image that is an image positioned within the overlapping area, the second generating process being a process of generating the second partial-dot-data such that density of the second partial-image represented by partial-dot-data generated when the second generating process is executed to the second partial-image data is equal to or less than density of a partial image represented by partial-dot-data generated when the first generating process is executed to the second partial-image data. When executed by the computer, the plurality of instructions cause the printer to, in the second generating process, determine a degree of reduction in density by the second generating process to a first degree of reduction in a first case where a particular condition including a code condition that is satisfied when the second partial-image includes at least a portion of the code image is satisfied, and determine the degree of reduction in density by the second generating process to a second degree of reduction that is different from the first degree of reduction in a case where the second partial-image does not include the code image.

In another aspect of the disclosure, a control method for controlling a printer, including a print head having a plurality of nozzles arranged in a first direction and configured to discharge ink, a first moving device configured to execute main scanning of moving the print head relatively with respect to a printing medium in a second direction intersecting the first direction, and a second moving device configured to execute sub scanning of moving the printing medium relatively with respect to the print head in the first direction, comprises the steps of obtaining object image data of an object image including a code image having a first area and a second area, brightness of which is different from brightness of the first area, the code image representing information by the first area and the second area, specifying the code image included in the object image, generating dot data, by using the object image data, in which each of a plurality of pixels has information representing dot forming states of the ink; and controlling the printing device to execute partial printing and the main scanning a plurality of times respectively so as to print the object image on the printing medium, the partial printing being printing in which a plurality of dots are formed on the printing medium based on the dot data by discharging the ink from the print head while the main scanning is executed. A plurality of print target areas includes a first print target area and a second print target area which are two print target areas adjacent to each other in the first direction and overlapping to each other, the plurality of print target areas respectively corresponding to the plurality of times of the partial printing on the printing medium. The control method includes the steps of generating first partial-dot-data of the dot data by executing a first generating process with respect to first partial-image data of the object image data, the first partial-image-data corresponding to a first partial-image that is an image positioned within a non-overlapping area that is an area except for an overlapping area in a total area of the first print target area and the second print target area, the overlapping area being an area where the first print target area and the second print target area overlap to each other, and generating second partial-dot-data of the dot data by executing a second generating process with respect to second partial-image-data of the object image data, the second partial-image-data corresponding to a second partial-image that is an image positioned within the overlapping area, the second generating process being a process of generating the second partial-dot-data such that density of the second partial-image represented by partial-dot-data generated when the second generating process is executed to the second partial-image data is equal to or less than density of a partial image represented by partial-dot-data generated when the first generating process is executed to the second partial-image data. In the second generating process, a degree of reduction in density by the second generating process is determined to a first degree of reduction in a first case where a particular condition including a code condition that is satisfied when the second partial-image includes at least a portion of the code image is satisfied, and the degree of reduction in density by the second generating process is determined to a second degree of reduction that is different from the first degree of reduction in a case where the second partial-image does not include the code image.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 5A is a schematic view illustrating changes of dot states formed on a recording sheet by printing;

FIG. 5B is a schematic view illustrating changes of dot states formed on the recording sheet by printing;

FIG. 5C is a schematic view illustrating changes of dot states formed on the recording sheet by printing;

EMBODIMENTS

First Embodiment

Figure 1:
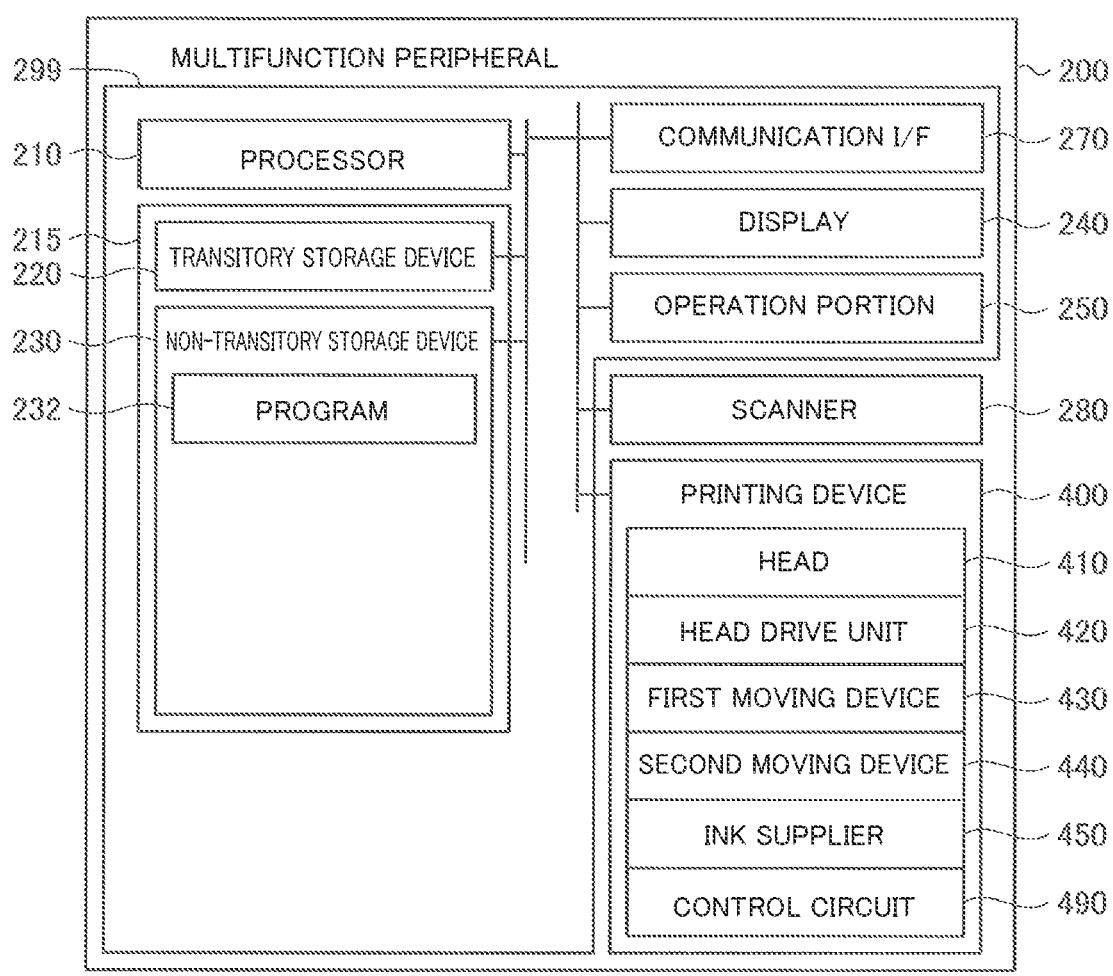
FIG. 1 is a schematic view illustrating a multifunction peripheral as an embodiment of a printer.

FIG. 1 is a schematic view illustrating a multifunction peripheral 200 as an embodiment of a printer. The multifunction peripheral 200 includes a controller 299, a scanner 280, and a printing device 400. The controller 299 includes a processor 210, a storage device 215, a display 240, an operation portion 250, and a communication interface 270. These components are connected to each other through a bus. The storage device 215 includes a transitory storage device 220 and a non-transitory storage device 230.

The processor 210 is a device configured to execute a data process, which is, for example, a CPU. The transitory storage device 220 is, for example, a DRAM, and the non-transitory storage device 230 is, for example, a flash memory.

The non-transitory storage device 230 stores a program 232. The processor 210 executes the program 232 to thereby realize various functions, the details of which will be described below. The processor 210 temporarily stores various intermediate data used for executing the program 232 into the storage device 215, for example, any of the transitory storage device 220 and the non-transitory storage device 230. In the present embodiment, the program 232 is stored in the non-transitory storage device 230 in advance as firmware by a manufacturer of the multifunction peripheral 200.

The display 240 is a device configured to display images such as a liquid crystal display and an organic EL display. The operation portion 250 is a device configured to receive operations by a user such as a touch panel, buttons and levers disposed so as to be superimposed on the display 240. The user can input various instructions to the multifunction peripheral 200 by operating the operation portion 250. The communication interface 270 is an interface for communicating with other devices. The communication interface includes, for example, a USB interface, a wired LAN interface, and a wireless interface of IEEE 802.11.

The scanner 280 is a reading device configured to optically read an object such as an original document by using a photoelectric conversion device such as a CCD and a CMOS. The scanner device 280 generates read data indicating an image that has been read, which is called a "read image". The read data includes, for example, bitmap data of RGB.

The printing device 400 is a device that prints images on a recording sheet, which is an example of a printing medium.

In the present embodiment, the printing device 400 includes a print head 410, which is also referred to simply as a head 410, a head drive unit 420, a first moving device 430, a second moving device 440, an ink supplier 450, and a control circuit 490 configured to control these components 410, 420, 430, 440, and 450. In the present embodiment, the printing device 400 is an ink-jet type printing device using respective inks of cyan C, magenta M, yellow Y, and black K. The control circuit 490 is constituted by a dedicated electric circuit configured to drive, for example, a motor and the like. The control circuit 490 may include a computer.

The controller 299 is configured to generate print data by using image data and control the printing device 400 to print an image by using the generated print data. The controller 299 can use the read data and image data stored in an external storage device, for example, a memory card connected to the communication interface 270, for generating print data. The controller 299 also controls the printing device 400 to print an image by using print data supplied from other external devices connected to the multifunction peripheral 200.

Figure 2:
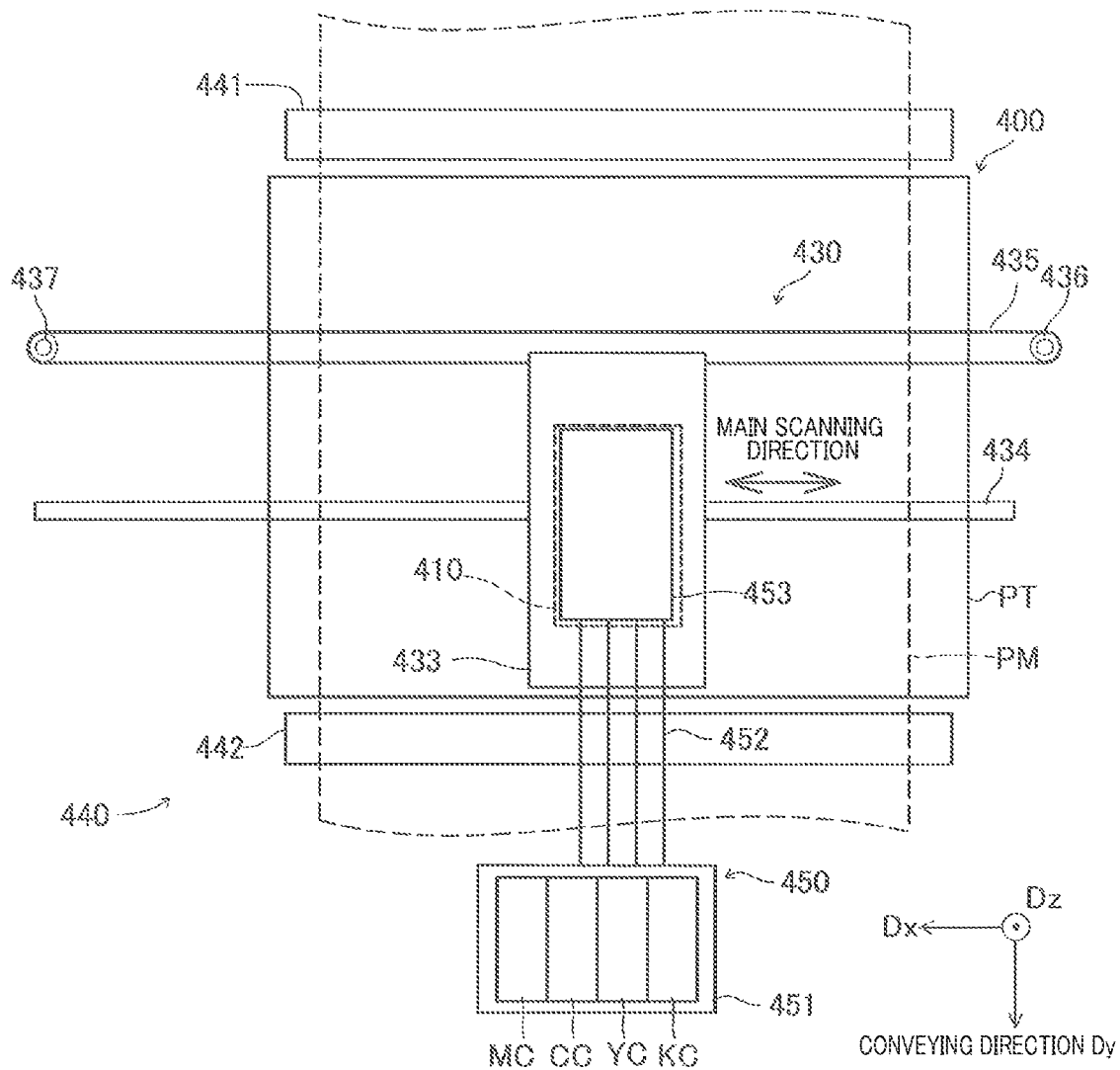
FIG. 2 is a schematic view illustrating a printing device.

FIG. 2 is a schematic view illustrating the printing device 400. The first moving device 430 includes a carriage 433, a sliding shaft 434, a belt 435, and a plurality of pulleys 436, 437. The head 410 is mounted on the carriage 433. The sliding shaft 434 supports the carriage 433 so as to reciprocate along a main scanning direction, which is a direction parallel to a Dx direction. The belt 435 is wound on the pulleys 436, 437, and a part of the belt 435 is fixed to the carriage 433. The pulley 436 is rotated by a power of a main scanning motor, which is not illustrated. When the main scanning motor rotates the pulley 436, the carriage 433 moves along the sliding shaft 434. Accordingly, main scanning in which the head 410 is moved along the main scanning direction with respect to a recording sheet PM is performed.

The second moving device 440 conveys the recording sheet PM in a Dy direction perpendicular to the main scanning direction with respect to the head 410 while holding the recording sheet PM. The Dy direction is also referred to as a conveying direction Dy in the following description. The Dy direction is also referred to as a +Dy direction, and an opposite direction to the +Dy direction is also referred to as a −Dy direction. The same applies to a +Dx direction and a −Dx direction. Printing of images on the recording sheet PM proceeds from the +Dy direction's side on the recording sheet PM toward the −Dy direction's side on the recording sheet PM.

The second moving device 440 includes a platen PT disposed at a position opposed to a surface of the head 410 from which ink is discharged and configured to support the recording sheet PM, a first roller 441 and a second roller 442 respectively configured to nip the recording sheet PM disposed on the platen PT, and a not-illustrated motor configured to drive the rollers 441, 442. The first roller 441 is disposed on the −Dy direction's side of the head 410, that is, upstream of the head 410 in the conveying direction, and the second roller 442 is disposed on the +Dy direction's side of the head 410, that is, downstream of the head 410 in the conveying direction. The recording sheet PM is supplied from a sheet tray, which is not illustrated, to the second moving device 440 by a sheet supply roller, which is not illustrated. The recording sheet PM supplied to the second moving device 440 is nipped between the first roller 441 and a driven roller, which is not illustrated, to be paired with the first roller 441 and conveyed to a sub-scanning direction +Dy direction's side by these rollers. The conveyed recording sheet PM is nipped between the second roller 442 and a driven roller, which is not illustrated, to be paired with the second roller 442 and conveyed to the sub-scanning direction +Dy direction's side by these rollers. The second moving device 440 drives these rollers 441, 442 by a power of the motor to thereby convey the recording sheet PM in the conveying direction Dy. Hereinafter, a process of moving the recording sheet PM in the conveying direction Dy is referred to as sub-scanning or also referred to as a conveying process. The conveying direction Dy is also referred to as a sub-scanning direction Dy. A Dz direction in FIGS. 2, 3 is a direction directed from the platen PT toward the head 410 and perpendicular to each of the two directions Dx, Dy.

The ink supplier 450 supplies ink to the head 410. The ink supplier 450 includes a cartridge mount portion 451, a plurality of tubes 452, and a buffer tank 453. A plurality of ink cartridges KC, YC, CC, and MC are mounted on the cartridge mount portion 451 so as to be attachable and detachable. The buffer tank 453 is disposed above the head 410 in the carriage 433, and temporarily stores ink to be supplied to the head 410 in units of inks of CMYK. The plurality of tubes 452 are flexible tubes that are flow paths for ink, which connect the cartridge mount portion 451 to the buffer tank 453. The ink in each of the ink cartridges KC, YC, CC, and MC is supplied to the head 410 through the cartridge mount portion 451, the plurality of tubes 452 and the buffer tank 453.

Figure 3:
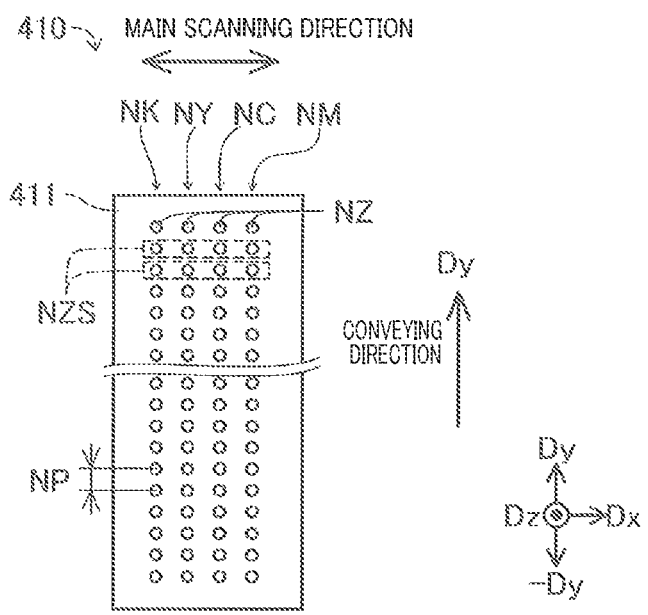
FIG. 3 is a perspective view illustrating a configuration of a head when viewed to the −Dz direction.

FIG. 3 is a perspective view illustrating a configuration of the head 410 when viewed toward the −Dz direction. In FIG. 3, the sub-scanning direction Dy is directed upward, which differs from FIG. 2. A plurality of nozzle groups NK, NY, NC, NM configured to respectively discharge above-described inks of K, Y, C, M are formed on a nozzle formed surface 411 that is a surface of the head 410 on the −Dz direction side. Each of the plurality of nozzle groups NK, NY, NC, NM has a plurality of nozzles NZ. Positions in the sub-scanning direction Dy differ among the plurality of nozzles NZ of one nozzle group. Positions in the main scanning direction of the nozzle groups NK, NY, NC, NM differ from one another. In the example of FIG. 3, the plurality of nozzle groups NK, NY, NC, NM are arranged in this order toward the +Dx direction.

In the present embodiment, positions in the sub-scanning direction Dy of the plurality of nozzles NZ of one nozzle group are disposed at equal intervals at a nozzle pitch NP. The nozzle pitch NP corresponds to a difference of positions in the sub-scanning direction Dy between two nozzles NZ adjacent to each other in the sub-scanning direction Dy. In the present embodiment, positions in the sub-scanning direction Dy of the plurality of nozzles NZ are the same in the four nozzle groups NK, NY, NC, NM. A nozzle set NZS illustrated in FIG. 3 is constituted by four nozzles NZ each selected from a corresponding one of the four nozzle groups NK, NY, NC, NM, which is a set of four nozzles NZ disposed at the same position in the sub-scanning direction Dy. A plurality of nozzle sets NZS are disposed on the nozzle formed surface 411. The plurality of nozzle sets NZS in the sub-scanning direction Dy are disposed at equal intervals at the nozzle pitch NP.

Each of the plurality of nozzles NZ is connected to the buffer tank 453 in FIG. 2 through ink flow paths, which is not illustrated, formed inside the head 410. Each of the ink flow paths is provided with an actuator configured to eject ink, which is not illustrated. For example, the actuator includes a piezoelectric element, a heater, and the like.

The head drive unit 420 illustrated in FIG. 1 includes an electric circuit that drives each of the actuators inside the head 410 during the main scanning by the first moving device 430. With this configuration, ink droplets are ejected on the recording sheet PM from the plurality of nozzles NZ in the head 410, thereby forming dots on the recording sheet PM. A process of forming dots by ejecting ink droplets on the recording sheet PM while the head 410 is moved in the main scanning direction is also referred to as partial printing in the following description. The head 410, the head drive unit 420, and the first moving device 430 prints an image on the recording sheet PM by executing the partial printing.

Outline of Printing

Figure 4:
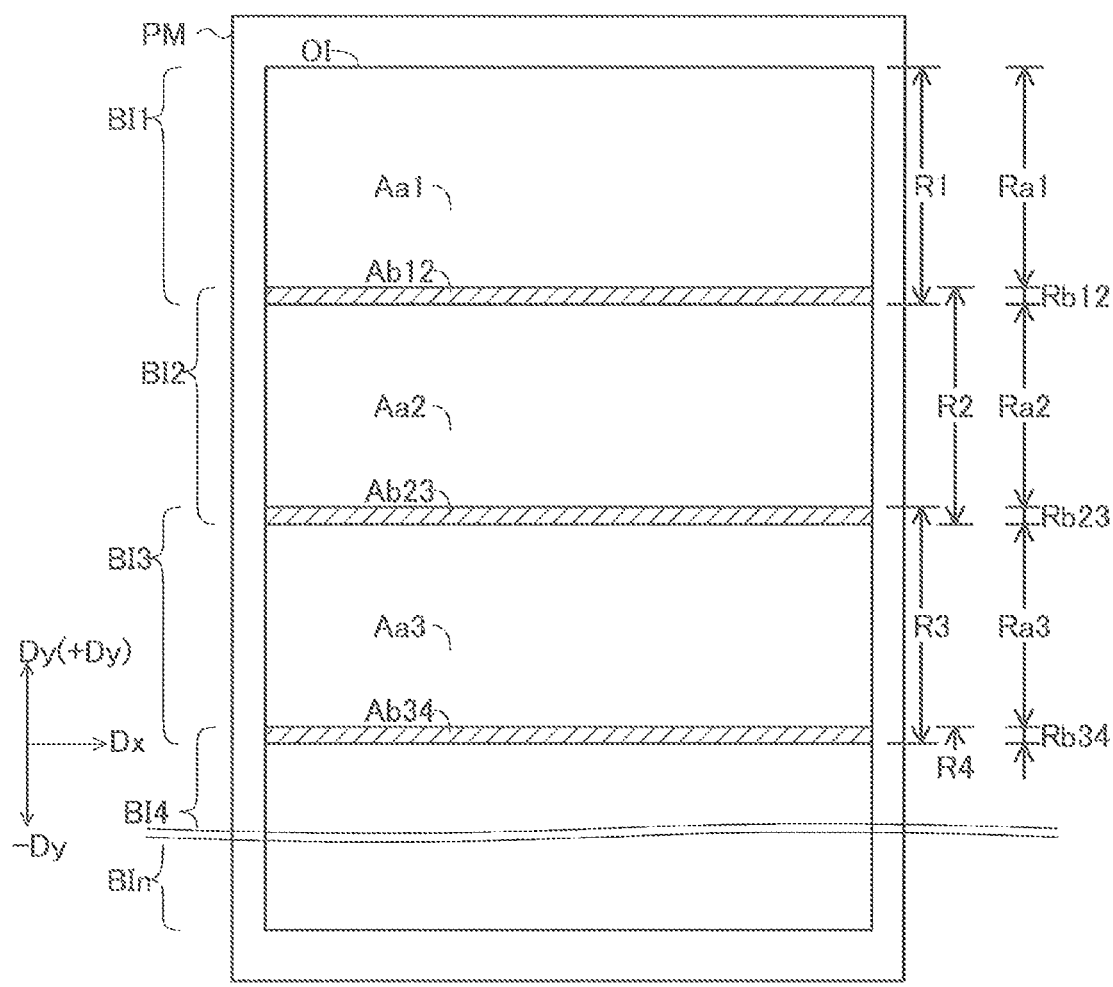
FIG. 4 is a schematic view illustrating an outline of printing by the printing device.

FIG. 4 is a schematic view illustrating an outline of printing by the printing device 400. In FIG. 4, the recording sheet PM and an object image OI that is an image to be printed on the recording sheet PM are illustrated. The object image OI includes a plurality of band images BI1 to BIn arranged from an end on the +Dy direction's side to the −Dy direction's side of the object image OI (more generally, the plurality of band images BI1 to BIn arranged in the sub-scanning direction Dy). Each of the band images BI1 to BIn is printed in a single partial printing, that is, printed by a single main scanning A shape of each of the band images BI1 to BIn is a rectangular shape extending in the main scanning direction, which is a direction parallel to the direction Dx in this case.

The plurality of band images are printed from a band image positioned at the end on the +Dy direction's side of the object image OI toward a band image positioned at the −Dy direction's side sequentially one by one. The partial printing and the conveying process executed after the partial printing are alternately executed a plurality of times respectively. In each partial printing, the head 410 moves in any of directions of bidirectional main scanning directions (+Dx direction and −Dx direction). Here, the partial printing by movement of the head 410 in the +Dx direction and the partial printing by movement of the head 410 in the −Dx direction may be alternately executed (also referred to as bidirectional printing). It is also preferable that the moving direction of the head 410 in the partial printing is predetermined one direction instead of the bidirectional printing.

Areas R1 to R4 in FIG. 4 are respectively areas of the band images BI1 to BI4 in the sub-scanning direction Dy. The areas of the band images in the sub-scanning direction Dy are print target areas of the partial printing corresponding to the band images. Hereinafter, a single partial printing is referred to as "a pass processing" or merely referred to as "pass". In the present embodiment, a width of each of the print target areas in the sub-scanning direction Dy is determined in advance. The width of one print target area is set to, for example, a width of a maximum area in which dots are formed by a single partial printing. The width is also referred to as a printable width. The width of one print target area may be less than the printable width, instead of the width of the maximum area.

In the example of FIG. 4, respective ends of two adjacent print target areas overlap each other. For example, an end of the first print target area R1 on the −Dy direction's side and an end of the second print target area R2 on the +Dy direction's side overlap each other. The same applies to other combinations of two adjacent print target areas.

In FIG. 4, overlapping areas Rb12, Rb23, and Rb34 are illustrated. The overlapping areas Rb12, Rb23, and Rb34 are areas in which two print target areas overlap each other. Two numerals following characters "Rb" in reference signs of overlapping areas indicate numbers of the two print target areas forming the overlapping area. For example, the overlapping area Rb23 is formed by the second print target area R2 and the third print target area R3.

In FIG. 4, non-overlapping areas Ra1, Ra2, and Ra3 are illustrated. Each of the non-overlapping areas Ra1, Ra2, and Ra3 is an area included in only a single print target area. One numeral following characters "Ra" in reference signs of the non-overlapping areas indicates a number of a single print target area forming the non-overlapping area. For example, the non-overlapping area Ra2 is formed by the second print target area R2.

The single print target area can include the overlapping area that is an area overlapping with another print target area and the non-overlapping area that is an area not overlapping with another print target area. Regions Aa1, Aa2, and Aa3 in FIG. 4 are regions respectively included in the non-overlapping areas Ra1, Ra2, and Ra3 in a region of the object image OI. Hereinafter, regions included in the non-overlapping areas are also referred to as non-overlapping regions in the region of the object image OI. A shape of each of the non-overlapping regions is a rectangular shape extending in the main scanning direction, which is a direction parallel to the Dx direction. Regions Ab12, Ab23, and Ab34 in FIG. 4 are areas respectively included in the overlapping areas Rb12, Rb23, and Rb34 in the region of the object image OI. Hereinafter, regions included in the overlapping areas are also referred to as overlapping regions in the region of the object image OI. A shape of each of the overlapping regions is a rectangular shape extending in the main scanning direction. In the present embodiment, a width in the sub-scanning direction Dy of each overlapping area is determined in advance. The width is, for example, equal to or greater than one pixel and equal to or less than ten pixels when represented by below-described print pixels.

A plurality of pixels, corresponding to a plurality of dots, included in each of the overlapping areas, for example, the overlapping area Rb12, Rb23, and Rb34, are distributed to two band images. That is, dots corresponding to a part of the plurality of pixels inside the overlapping area are printed at the time of printing the band image on the +Dy direction's side. Then, dots corresponding to a remaining part of the plurality of pixels inside the overlapping area are printed at the time of printing the band image on the −Dy direction's side. With this configuration, it is possible to suppress troubles in color to be printed, for example, white streaks or density unevenness, at a boundary, namely the overlapping area, between the band image on the +Dy direction's side and the band image on the −Dy direction's side.

FIGS. 5A to 5C are schematic views illustrating changes of dot states formed on the recording sheet by printing. FIGS. 5A to 5C respectively illustrate a plurality of dot states. The dot state changes in orders illustrated by arrows AR. Here, dots are respectively formed at nine pixel-positions of three rows and three columns. An image expressed by nine dots is also referred to as a reference image. The controller 299 in FIG. 1 controls the printing device 400 to print an image by using dot data representing respective dot forming states corresponding to the plurality of pixel positions. In the present embodiment, the dot forming states represented by dot data is determined to any of a plurality of states including "without dot" and with dot having two or more kinds of dots sizes that are differ from one another, the details of which are described below. The larger the size of dots represented by the dot forming state becomes, the larger a volume of an ink droplet forming the dot becomes. The ink droplets adhere to the recording sheet form dots on the recording sheet. Dots on the recording sheet are disposed in regions where color material of ink adheres on the recording sheet, which are specified by observing the recording sheet. The dot size on the recording sheet normally becomes large as the volume of the ink droplet is increased. After the ink droplet is ejected on the recording sheet, the ink can move on the recording sheet. For example, the ink can be spread on the recording sheet. A moving amount of ink on the recording sheet can change in accordance with dot states of dots ejected at adjacent pixel positions. Accordingly, the shape and size of dots on the recording sheet can change even when dot forming states represented by dot data are the same.

FIG. 5A illustrates an example of printing of the non-overlapping area. Nine dots with the same size, first kind of dots DT1 in this case, are formed at respective nine pixel-positions. A first state SA1 is a state when nine ink droplets reach the recording sheet. Nine first kind of dots DT1 are formed. In a second state SA2 subsequent to the first state SA1, the ink penetrates into the recording sheet, which slightly increases the size of dots on the recording sheet. A width Wa in FIG. 5A is a width in a horizontal direction of a reference image Ia specified by observing the printed reference image Ia.

FIG. 5B illustrates an example of printing of the overlapping area. Nine first kind of dots DT1 are formed at respective nine pixel-positions in the same manner as the example of FIG. 5A. Dots in a first row DR1 and a third row DR3 are formed by preceding partial printing, and dots in a second row DR2 are formed by subsequent partial printing.

A first state SB1 is a state when six ink droplets reach the recording sheet in the preceding partial printing. Six first kind of dots DT1 in the first row DR1 and the third row DR3 are formed as illustrated in FIG. 5B. In a second state SB2 subsequent to the first state SB1, the ink penetrates into the recording sheet, which slightly increases the size of dots on the recording sheet. A third state SB3 subsequent to the second state SB2 is a state when three ink droplets reach the recording sheet in the subsequent partial printing. Three first kind of dots DT1 in the second row DR2 are formed as illustrated in FIG. 5B. The dots in the second row DR2 are formed later than the dots in the other rows DR1, DR3. Therefore, dots in the second row DR2 are formed in a state in which ink of the dots in the other rows DR1, DR3 has been absorbed into the recording sheet.

In a fourth state SB4 subsequent to the third state SB3, the size of the dots in the second row DR2 on the recording sheet is largely increased. The reason thereof is as follows. Generally, ink can easily move on the recording sheet until being absorbed in the recording sheet after being ejected on the recording sheet. In a case where two dots contact with each other on the recording sheet, inks of respective two dots pull at each other due to an effect such as surface tension of the ink. As described above, the ink of the dots in the first row DR1 and the third row DR3 has already been absorbed into the recording sheet in the third state SB3 when the dots in the second row DR2 are formed. Accordingly, the ink of the dots in these rows DR1, DR3 does not easily move on the recording sheet. The ink is ejected at pixel positions of the second row DR2 in this state. The ink of the dots in the second row DR2 can be pulled by the ink of the dots in the first row DR1 and the third row DR3 and flow in a wide area before being absorbed into the recording sheet. The dots in the second row DR2 can be expanded largely on the recording sheet toward the first row DR1 side and the third row DR3 side, for example, as illustrated in the fourth state SB4 in FIG. 5B. Such increase in size of dots on the recording sheet may change the color of the printed image from an intended color. For example, suppose that the image in the overlapping area and the image in the non-overlapping area should have the same color. In this case, in the printed image, the density of the image in appearance in the overlapping area can be greater than the density of the image in the non-overlapping area in appearance.

In the example of FIG. 5A, the plurality of dots are formed almost at the same timing. With this configuration, forces of pulling the ink are almost the same among the plurality of dots. As a result, in the example of FIG. 5A, the increase in size of dots on the recording sheet occurring in the fourth state SB4 in FIG. 5B hardly occurs.

In the present embodiment, a process of generating dot data for the overlapping area differs from a process of generating dot data for the non-overlapping area in order to suppress unintended deviation in color between the overlapping area and the non-overlapping area, the details of which will be explained below. The density of the image represented by dot data for printing in the overlapping area can be reduced. The dot size in the overlapping area can be easily reduced than in the non-overlapping area in the present embodiment.

FIG. 5C illustrates another example of printing of the overlapping area. FIG. 5C illustrates a case where the density of the image represented by dot data is reduced, which differs from the case of FIG. 5B. In order to print the same image as the image of FIG. 5A, the dot data for printing in FIG. 5C differs from dot data for printing in FIG. 5A. In the example of FIG. 5C, four second kind of dots DT2, which are smaller than the first kind of dots DT1, are correlated at pixel positions of four corners in nine pixel-positions of three rows and three columns Five first kind of dots DT1 are correlated at other pixel positions in the same manner as the example of FIG. 5A.

A first state SC1 is a state when six ink droplets reach the recording sheet in the preceding partial printing. Six dots of the first row DR1 and the third row DR3 are formed as illustrated in FIG. 5C. The four second kind of dots DT2 are formed at pixel positions of four corners (a first column DC1 and a third column DC3 in this case). In a second state SC2 subsequent to the first state SC1, the ink penetrates into the recording sheet, which slightly increases the size of dots on the recording sheet. A third state SC3 subsequent to the second state SC2 is a state when three ink droplets reach the recording sheet in the subsequent partial printing. Three first kind of dots DT1 in the second row DR2 are formed as illustrated in FIG. 5C.

In a fourth state SC4 subsequent to the third state SC3, the size of dots in the second row DR2 on the recording sheet is increased. In the first column DC1 and the third column DC3, dots in the first row DR1 and the dots in the third row DR3 are the second kind of dots DT2 that are smaller than the first kind of dots DT1, and the fourth state SC4 differs from the fourth state SB4 in FIG. 5B. When the size of dots is small, the force of pulling the ink of other dots is smaller as compared with the case where the size of dots is large. Accordingly, an increase amount of the size of dots in the second row DR2 in the first column DC1 and the third column DC3 on the recording sheet is less than the example of FIG. 5B.

As described above, the size of dots represented by dot data is reduced at the plurality of pixel positions in the overlapping area, the details of which will be described below. Accordingly, even when dots formed by the subsequent partial printing become large on the recording sheet, an increase amount is reduced. In the overlapping area, the size of dots formed on the recording sheet by the subsequent partial printing can be increased, however, the size of dots represented by dot data is reduced at a part of the plurality of pixel positions in the subsequent partial printing. Accordingly, when the entire of the plurality of dots is observed, deviation of density in appearance between the overlapping area and the non-overlapping area is suppressed.

In the example of FIG. 5C, the size of dots formed by the preceding partial printing is reduced. It is also preferable that the size of dots formed by the subsequent partial printing is reduced instead of the above. Also in this case, the increase amount of dots formed by the subsequent partial printing can be reduced. With this configuration, deviation of density in appearance between the overlapping area and the non-overlapping area is suppressed.

A width Wb is illustrated in the fourth state SC4 in FIG. 5C. The width Wb is a width in the horizontal direction of a reference image Ib specified by observing the printed reference image Ib. Since the size of the plurality of dots is reduced, the width Wb can be smaller than the width Wa in FIG. 5A. Widths in other directions, for example, a width in a vertical direction, can be small in the same manner, not limited to the width in the horizontal direction, though not illustrated. When the density of the image represented by dot data is reduced as described above, a minute shape of the image to be printed may be thin. The change in shape of the image can cause difficulty in proper reading of the printed image. For example, in a case where the image in the overlapping area includes a one-dimensional barcode, black bars of the barcode to be printed may become improperly thin. As a result, the proper reading of the barcode may be difficult. The same applies to a case of printing a two-dimensional code, not limited to the one-dimensional code such as the barcode. In the present embodiment, the controller 299 in FIG. 1 executes a printing process so as to print the code image properly as described below.

Figure 6:
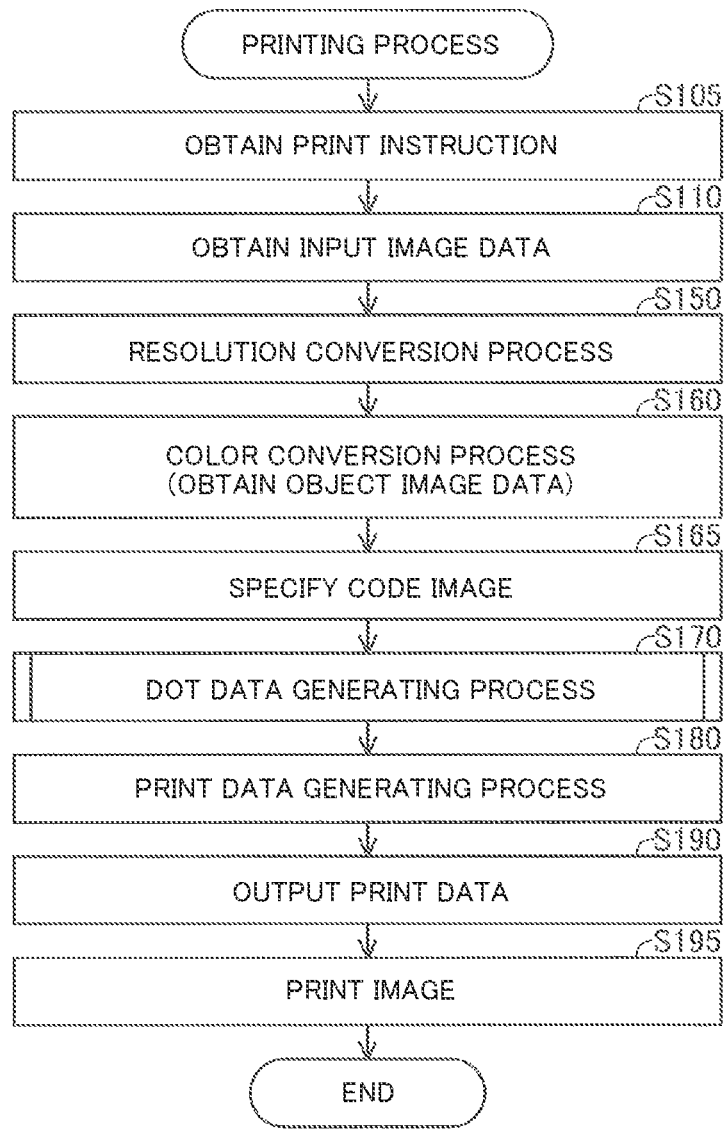
FIG. 6 is a flowchart illustrating an example of a print process.

FIG. 6 is a flowchart illustrating an example of the printing process. The processor 210 in the controller 299 starts the process of FIG. 6 in accordance with a print instruction. The processor 210 executes the process of FIG. 6 in accordance with the program 232. At S105, the processor 210 obtains the print instruction. A method for obtaining the print instruction may be an arbitrary method. The user inputs the print instruction by operating the operation portion 250 in FIG. 1 in the present embodiment. The print instruction includes information for designating input image data representing a print object image. The input image data may be various data, and may be, for example, image data already stored in the storage device 215, for example, the non-transitory storage device 230. The processor 210 may also obtain the print instruction from another device, for example, a computer connected to the multifunction peripheral 200.

At S110, the processor 210 obtains input image data designated by the print instruction. In the present embodiment, bitmap data is used as the input image data. Pixel values of respective pixels in the input image data are represented by color values of R (red), G (green), and B (blue) in 256 gradations from 0 (zero) to 255. In a case where image data designated by the print instruction is JPEG data, the processor 210 obtains input image data by uncompressing the JPEG data. In a case where a format of image data designated by the print instruction is a format different from the bitmap format, for example EMF (Enhanced Meta-File) format, the processor 210 uses, as the input image data, bitmap data generated by converting, for example, rasterizing, the data format.

At S150, the processor 210 generates input image data with a predetermined resolution for printing by executing a process of converting the resolution (namely, pixel density) of the input image data. Pixels with the resolution for printing are also referred to as print pixels in the following description. The pixels explained in FIG. 5A to FIG. 5C correspond to the print pixels. When the resolution of the input image data is the same as the print resolution, S150 is omitted.

At S160, the processor 210 executes a color conversion process of the input image data. The color conversion process is a process of converting color values of the input image data (RGB values in the present embodiment) into color values of an ink color space. The ink color space is a color space corresponding to a plurality of kinds of ink colors usable for printing. The ink color space is a CMYK color space in the present embodiment. The pixel values of respective pixels in image data which has been color-converted are represented by color values of C, M, Y, and K in 256 gradations from 0 (zero) to 255. The processor 210 executes the color conversion process by referring to a color conversion profile, which is not illustrated, indicating a correspondence relationship between color values in the color space of the input image data and color values in the ink color space. The color conversion profile is a lookup table in the present embodiment.

Figure 7:
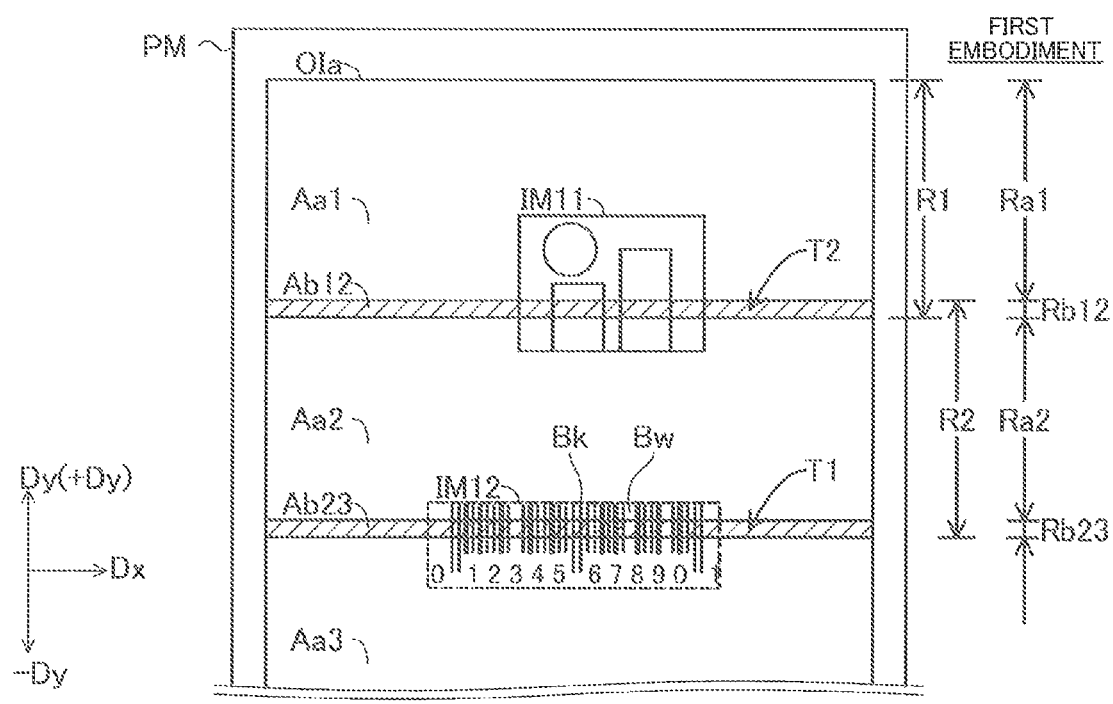
FIG. 7 is a schematic view illustrating an example of an object image.

At S165, the processor 210 specifies the code image included in the object image. FIG. 7 is a schematic view illustrating an example of the object image printed on the recording sheet PM. In FIG. 7, the recording sheet PM and an object image OIa on the recording sheet PM are illustrated. The print target areas R1, R2, the non-overlapping areas Ra1, Ra2, the non-overlapping regions Aa1, Aa2, Aa3, overlapping areas Rb12, Rb23, and the overlapping regions Ab12, Ab23 are the same as corresponding elements in FIG. 4, respectively.

The object image OIa includes two objects IM11 and IM12. The first object IM11 is an image of a picture (also referred to as a picture image IM11). The second object IM12 is an image of a one-dimensional barcode, which is also referred to as a barcode image IM12. A portion of the picture image IM11 is included in the overlapping region Ab12. A portion of the barcode image IM12 is included in the overlapping region Ab23. The barcode image IM12 includes a plurality of black bars Bk and a plurality of white bars Bw. A color of the while bars Bw, white in this case, is brighter than a color of the black bars, black in this case. These bars Bk and Bw are parallel to the sub-scanning direction Dy.

At S165, the processor 210 specifies the code image inside the object image by analyzing the image data which has been color-converted. In the present embodiment, the processor 210 specifies the image of the one-dimensional barcode. In the example of FIG. 7, the processor 210 specifies the barcode image IM12. It is noted that the object image may include a plurality of code images. In this case, the processor 210 specifies the plurality of code images.

As a particular process of specifying code images, various well-known processes can be adopted. For example, a process described in JP-A-2006-330906 can be adopted. Specifically, the processor 210 detects luminance-level patterns changing along inspection lines respectively relating to a plurality of inspection lines parallel to one another on the object image. Then, the processor 210 compares the luminance-level patterns of the plurality of inspection lines. When luminance-level patterns are similar to one another among the plurality of inspection lines, the processor 210 adopts a portion representing similar luminance-level patterns among the plurality of inspection lines as the one-dimensional barcode image. A rectangular region is adopted as the one-dimensional barcode image. The processor 210 specifies the region representing the code image inside the object image. The processor 210 also specifies a direction perpendicular to the inspection lines as a direction in which bars are extended. The processor 210 detects a barcode including the bars Bk and Bw perpendicular to the main scanning direction such as the barcode image IM12 in FIG. 7 by using inspection lines parallel to the main scanning direction (for example, pixel lines formed by a plurality of print pixels arranged in the main scanning direction). The processor 210 detects a barcode including bars perpendicular to the sub-scanning direction Dy by using inspection lines parallel to the sub-scanning direction Dy (for example, pixel lines formed by a plurality of print pixels arranged in the sub-scanning direction Dy), though not illustrated. Other various processes may be adopted instead of the above process, such as a process described in JP-A-2017-182455.

At S170 in FIG. 6, the processor 210 generates dot data by using image data which has been color-converted. In the present embodiment, the dot data represents the dot forming state by each color component as well as by each print pixel. The dot forming state is a state of dots to be formed by printing. In the present embodiment, the dot forming state is determined to any of "large dots", "middle dots", "small dots" and "without dot". Hereinafter, image data used for generating dot data is also referred to as object image data. The image data which has been color-converted is an example of the object image data in the present embodiment. The details of a generating process of dot data will be described below.

As S180, the processor 210 generates print data by using the dot data. The print data is data in a data format interpretable by the control circuit 490 in the printing device 400 in FIG. 1. The print data includes a plurality of partial print data and a plurality of conveyance data which are alternately aligned in the present embodiment. One partial print data represents a dot pattern to be formed by a single partial printing (namely, the band image). The conveyance data represents a conveyance amount of the recording sheet PM after the partial printing based on immediately-preceding partial print data. The conveyance amount is previously determined in the present embodiment. The order of aligning the plurality of partial print data is the same as the order of aligning the plurality of band images aligning from an end of the object image OIa on the +Dy direction's side toward the −Dy direction's side.

It is noted that the plurality of print pixels in the overlapping areas, for example, the overlapping areas Rb12 and Rb23 in FIG. 4 and FIG. 7, are classified into any of (a) preceding allowable pixels in which dot formation by preceding partial printing is allowed and (b) subsequent allowable pixels in which dot formation by subsequent partial printing is allowed. The preceding allowable pixels and the subsequent allowable pixels are determined in accordance with a predetermined arrangement pattern in the present embodiment. Various patterns can be adopted as the arrangement pattern. For example, the arrangement pattern may be a pattern in which the preceding allowable pixels and the subsequent allowable pixels are alternately aligned along the Dx direction as well as along the Dy direction. Alternatively, it is also preferable that the arrangement pattern may be determined such that the density of the preceding allowable pixels becomes gradually lower from a preceding print target area's side toward a subsequent print target area's side, and such that the density of the subsequent allowable pixels becomes gradually lower from the subsequent print target area's side toward the preceding print target area's side. The arrangement patterns may differ among a plurality of color components. The arrangement pattern may be common among a plurality of color components.

At S190 in FIG. 6, the processor 210 outputs print data to the printing device 400. At S195, the control circuit 490 of the printing device 400 controls the printing device 400 in accordance with the print data to print the object image. A plurality of band images forming the object image are printed from the band image positioned at the end on the +Dy direction's side toward the −Dy direction sequentially one by one. Then, the flow of FIG. 6 ends.

Figure 8:
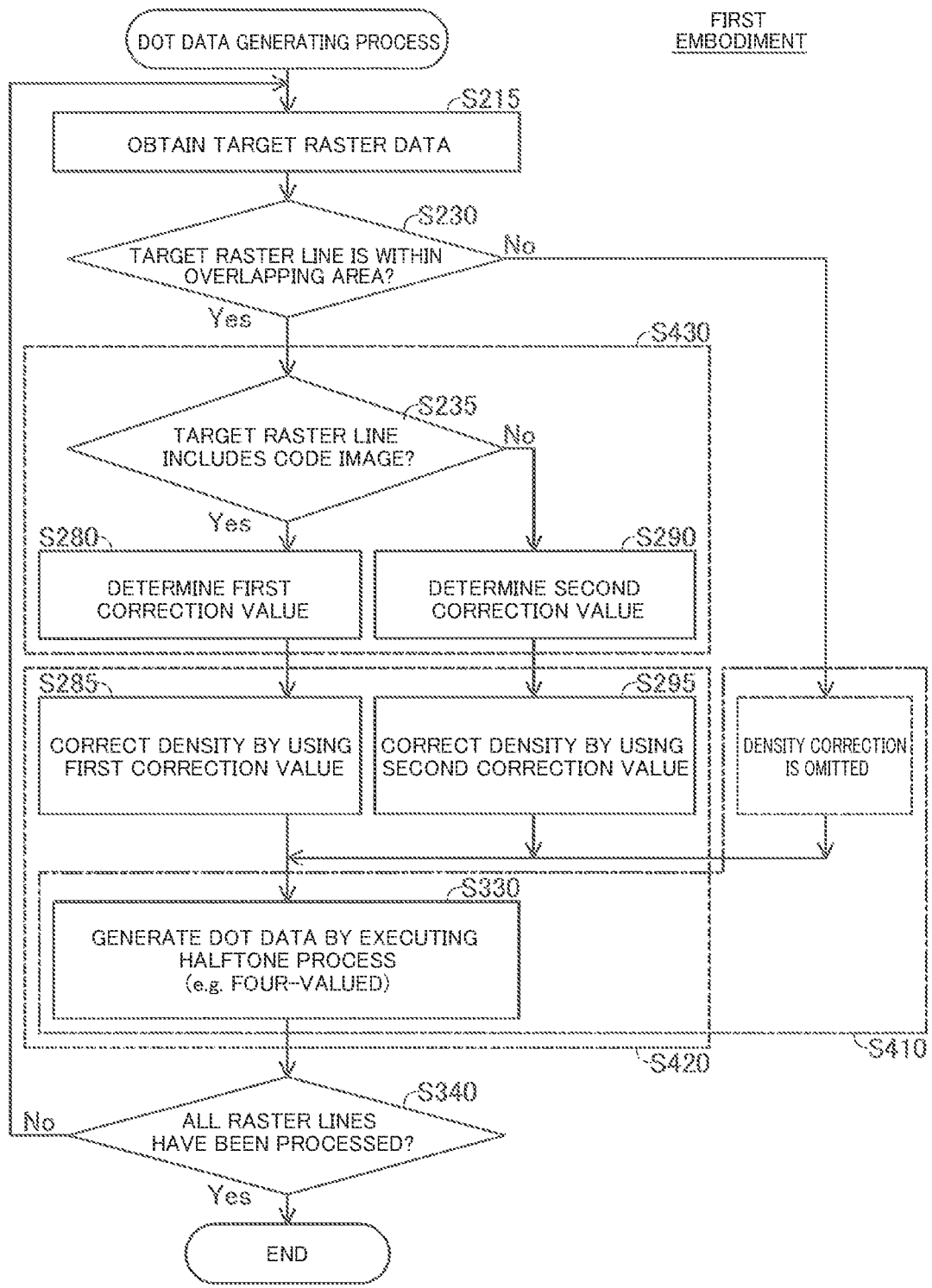
FIG. 8 is a flowchart illustrating an example of a dot data generating process.

FIG. 8 is a flowchart illustrating an example of a dot data generating process. At S215, the processor 210 obtains target raster data from the object image data. Here, pixel lines constituted by a plurality of print pixels aligning in the main scanning direction, which is the direction parallel to the Dx direction, at the time of printing are called raster lines. A plurality of print pixels included in the object image form a plurality of raster lines aligning in the sub-scanning direction Dy. The plurality of raster lines are processed from a rater line positioned at the end of the object image on the +Dy direction's side toward the −Dy direction sequentially one by one in the present embodiment. The target raster data corresponds to the raster line at the end on the +Dy direction's side of unprocessed raster lines.

At S230, the processor 210 determines whether a target raster line is within the overlapping area or not. For example, the target raster line is included in the non-overlapping areas Ra1 or Ra2 in FIG. 7, a determination result of S230 is No. In this case, the processor 210 omits below-described density correction, and the flow proceeds to S330. When the target raster line is included in the overlapping areas Rb12 or Rb23, the determination result of S230 is Yes. In this case, the flow executed by the processor 210 proceeds to S235.

At S235, the processor 210 determines whether a condition CdC indicating that the target raster line includes at least a portion of the code image is satisfied or not. For example, when the target raster line is included in the overlapping area Rb23 in FIG. 7, the target raster line includes a portion of the barcode image IM12; therefore, a determination result of S235 is Yes. When the determination result of S235 is Yes, the flow executed by the processor 210 proceeds to S280.

Figure 9:
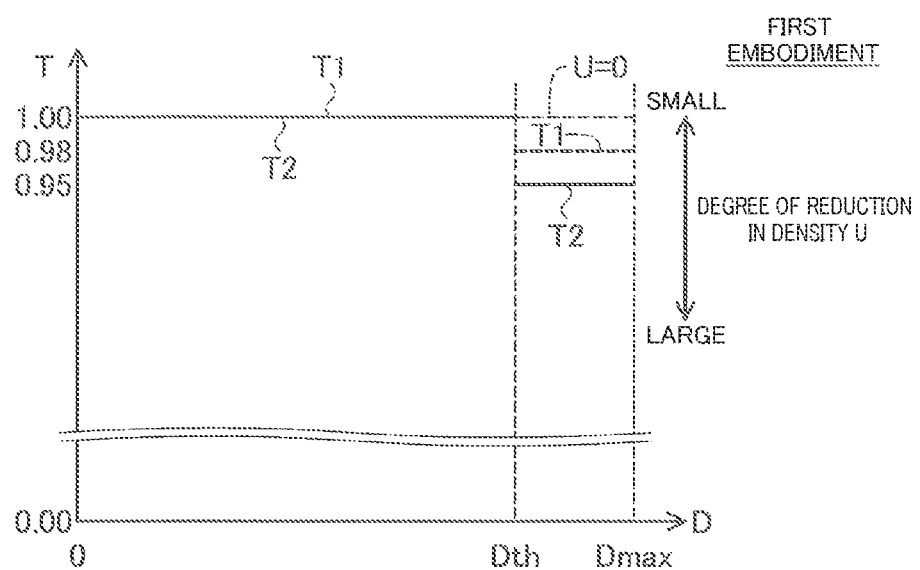
FIG. 9 is a graph representing an example of correction values.

At S280, the processor 210 determines a first correction value T1 of each of the plurality of pixels of the target raster line. FIG. 9 is a graph representing an example of correction values. A horizontal axis represents total color value D, and a vertical axis represents correction values T. The total color value D is a total value of respective color values of CMYK. The deeper the color of the print pixel is, the greater the total color value D is. The total color value D is a value that is equal to or greater than zero and equal to or less than the maximum value Dmax. As described below, the correction value T is multiplied by respective color values of CMYK for correcting the density. The correction value T is a value that is equal to or greater than zero and equal to or less than 1.00. In the present embodiment, when the total color value D is equal to or less than a threshold value Dth, the first correction value T1 is set to 1.00. When the total color value D is greater than the threshold value Dth, the first correction value T1 is set to 0.98. The first correction value T1 is determined by each pixel.

At S285 in FIG. 8, the processor 210 executes density correction of the plurality of respective pixels of the target raster line. In the present embodiment, the processor 210 calculates the respective corrected color values of CMYK by multiplying respective color values of CMYK by the first correction value T1. When the first correction value T1 is equal to 1.00, the respective color values of CMYK are not changed, that is, the density is not changed. When the first correction value T1 is less than 1.00, the corrected color values become smaller than color values before correction; therefore, the density is reduced. The correction of color values of CMYK is executed by each pixel. After S285, the flow executed by the processor 210 proceeds to S330.

When the target raster line does not include the code image, the determination result of S235 is No. For example, when the target raster line is included in the overlapping area Rb12 (FIG. 7), the determination result of S235 is No. In this case, the processor 210 determines a second correction value T2 of each of the plurality of pixels of the target raster line at S290. In the present embodiment, when the total color value D is equal to or less than the threshold value Dth, the second correction value T2 is set to 1.00 as illustrated in FIG. 9. When the total color value D is greater than the threshold value Dth, the second correction value T2 is set to 0.95. When the total color value D is greater than the threshold value Dth, the second correction value T2 is smaller than the first correction value T1. The second correction value T2 is determined by each pixel.

At S295, the processor 210 executes density correction of the plurality of respective pixels in the target raster line. The only point of difference from the processing at S285 is that the second correction value T2 is used instead of the first correction value T1. The correction of color values of CMYK is executed by each pixel. After S295, the flow executed by the processor 210 proceeds to S330.

At S330, the processor 210 executes a halftone process of the target raster data. Processes of various methods may be adopted as the halftone process such as an error diffusion method and a method using dither matrix. The processor 210 generates raster dot data which is dot data for the target raster line by the halftone process. When the determination result of S230 is Yes, that is, when the processing at S285 or S295 has been executed, the processor 210 generates the raster dot data by using the corrected color values of CMYK. When the determination result S230 is No, the processor 210 generates raster dot data by using uncorrected color values of CMYK.

As illustrated in FIG. 9, the correction value T is set to a value less than 1.00 when the total color value D is greater than the threshold value Dth in the present embodiment. Accordingly, the respective color values of CMYK as print pixels having deep colors become smaller. As a result, at S330 in FIG. 8, it is difficult to generate large dots and easy to generate smaller dots, for example, middle dots and small dots, and "without dot". Accordingly, the density of an image to be printed is reduced as in the example of FIG. 5C.

Generally, the smaller the correction value T is, the larger the degree of reduction in density is. The correction value T has negative correlation with the degree of reduction in density. The correction value T is an index value indicating the degree of reduction in density. To determine the correction value T means to determine the degree of reduction in density.

In the example of FIG. 7, the first correction value T1 is applied to the overlapping region Ab23 including the code image. The second correction value T2 is applied to the overlapping region Ab12 not including the code image. As illustrated in FIG. 9, when the total color value D is greater than the threshold value Dth, the second correction value T2 is smaller than the first correction value T1. Accordingly, the degree of reduction in density is relatively large in the overlapping region Ab12. As a result, deviation of density in appearance between the overlapping area Rb12 and the non-overlapping areas Ra1, Ra2 is suppressed as in the example of FIG. 5C. The degree of reduction in density is relatively small in the overlapping region Ab23. Accordingly, it is possible to suppress improper reduction in width of the black bars Bk in the barcode image IM12.

The threshold value Dth is experimentally determined in advance such that the deviation of density in appearance between the overlapping area and the non-overlapping area on the printed image is suppressed and the barcode image included in the overlapping area can be properly printed.

At S340 in FIG. 8, the processor 210 determines whether the process of all raster lines has been completed or not. When there remains an unprocessed raster line (S340: No), the flow executed by the processor 210 proceeds to S215 and a new target raster line is processed. When the process of all raster lines has been completed (S340: Yes), the flow of FIG. 8, namely, the processing of S170 in FIG. 6 ends.

As described above, the multifunction peripheral 200 in FIG. 1 is an example of the printer including the printing device 400 and the controller 299. The printing device 400 includes the print head 410, the first moving device 430, and the second moving device 440. The print head 410 has the plurality of nozzles NZ in which positions in the sub-scanning direction Dy differ from one another and which are configured to eject ink as illustrated in FIG. 3. As explained with reference to FIG. 2, the first moving device 430 is configured to execute the main scanning that relatively moves the print head 410 in the main-scanning direction, which is the direction parallel to the Dx direction, intersecting the sub-scanning direction Dy with respect to the recording sheet PM. The second moving device 440 is configured to execute the sub-scanning that relatively moves the recording sheet PM in the sub-scanning direction Dy with respect to the print head 410.

The controller 299 is configured to execute the following processes. At S160 in FIG. 6, the controller 299 in FIG. 1 obtains the object image data of the object image including the one-dimensional barcode image. The barcode image IM12 of FIG. 7 is an example of the one-dimensional barcode image, and the object image OIa is an example of the object image including the one-dimensional barcode. The one-dimensional barcode image is a code image representing information by a dark part having relatively dark color (the plurality of black bars Bk in this case) and a bright part having relatively bright color (the plurality of white bars Bw in this case) as illustrated by the barcode image IM12. At S165 in FIG. 6, the controller 299 specifies the code image included in the object image. At S170 (namely, the process of FIG. 8), the controller 299 generates the dot data representing the dot forming state of ink by each pixel by using the object image data. At S180 to S190 in FIG. 6, the controller 299 generates print data by using the dot data and controls the printing device 400 to print the object image by using the print data. Here, the controller 299 controls the printing device 400 to execute the partial printing that forms dots on the recording sheet PM by making the print head 410 ejecting ink while executing the main scanning and to execute the sub-scanning a plurality of times respectively.

As illustrated in FIG. 4 and FIG. 7, the respective print target areas of the partial printing of a plurality of times in the sub-scanning direction Dy on the recording sheet PM, for example, the print target areas R1 to R4, are disposed such that ends of adjacent two print target areas overlap to each other.

In the dot data generating process of FIG. 8, when the target raster line is within the non-overlapping area (S230: No), the controller 299 generates the raster dot data at S330 without correcting the density. Hereinafter, a process of generating raster dot data without correcting the density is referred to as a first generating process S410. When the first generating process S410 is executed, the target raster data indicates an image of the target raster line within the non-overlapping area of the object image data. That is, the target raster data is an example of first partial-image data of a first partial-image (an image of the target raster line in this case) which is the image within the non-overlapping area. The raster dot data generated at S330 is an example of first partial-dot-data corresponding to the first partial-image in dot data. The controller 299 is configured to generate the raster dot data by executing the first generating process S410 (namely, a generating process of raster dot data without density correction) with respect to the target raster data.

When the target raster line is within the overlapping area in the dot data generating process of FIG. 8 (S230: Yes), the controller 299 executes the density correction process (S285 or S295) and the generating process of the raster dot data (S330). Hereinafter the entire these processes are also referred to as a second generating process S420. When the second generating process S420 is executed, the target raster data indicates an image of the target raster line within the overlapping area of the object image data. That is, the target raster data is an example of second partial-image data of a second partial-image (an image of the target raster line in this case) which is the image within the overlapping area. The raster dot data generated at S330 is an example of the second partial-dot-data corresponding to the second partial-image in dot data. The controller 299 is configured to generate the raster dot data by executing the second generating process S420 (including the density correction process and the generating process of raster dot data) with respect to the target raster data.

In the second generating process S420, the processing of the density correction using the first correction value T1 (S285) or the processing of the density correction using the second correction value T2 (S295) is executed. Accordingly, the density of the image of the target raster line represented by raster dot data generated by the second generating process S420 can be reduced. Specifically, the density of the image of the target raster line represented by the raster dot data generated when the second generating process S420 is executed is equal to or smaller than the density of the target raster line represented by the raster dot data generated when the first generating process S410 is executed with respect to the same target raster data.

The controller 299 further determines the correction value T used in the second generating process S420 by S235, S280, and S290 of FIG. 8. Hereinafter, the entire of these processes is also referred to as a determination process S430. The correction value T represents the degree of reduction in density by the second generating process S420 as illustrated in FIG. 9. The controller 299 determines the correction value T to thereby determine the degree of reduction in density by the second generating process S420.

When the condition CdC at S235 of FIG. 8 is satisfied, the controller 299 determines the first correction value T1 at S280. When the condition CdC is not satisfied, the controller 299 determines the second correction value T2 at S290. The condition CdC is an example of a code condition indicating that the second partial image (the image of the target raster line in this case) includes at least a portion of the code image (also referred to a code condition CdC). A particular condition as a condition for using the first correction value T1 is that the code condition CdC is satisfied. As illustrated in FIG. 9, the degree of reduction in density by the first correction value T1 differs from the degree of reduction in density by the second correction value T2. As described above, in a first case where the particular condition including the code condition CdC is satisfied (S235: Yes), the controller 299 is configured to determine the degree of reduction in density (a degree of reduction by the first correction value T1) to a degree different from the degree of reduction in density (a degree of reduction by the second correction value T2) in a second case where the second partial image (the image of the target raster line in this case) does not include the code image (S235: No). Accordingly, the code image can be properly printed.

Also as illustrated in FIG. 9, the degree of reduction in density obtained when the first correction value T1 is used is smaller than the degree of reduction in density obtained when the second correction value T2 is used. As described above, the controller 299 is configured to determine the degree of reduction in density in the first case (S235: Yes) to be a degree smaller than the degree of reduction in density in the second case (S235: No). Accordingly, the printing of a light code image in print density can be suppressed. As a result, it is possible to suppress improper reduction in width of elements in the code image, for example, the black bars Bk in FIG. 7.

Second Embodiment

Figure 10A:
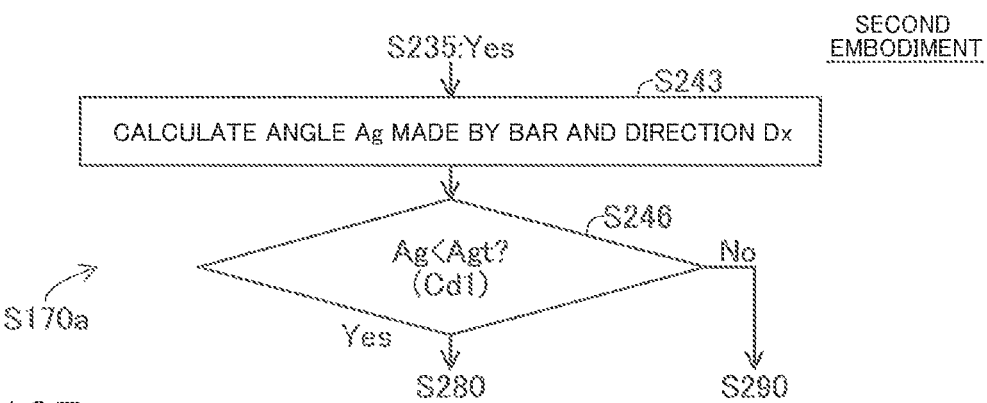
FIG. 10A is a flowchart illustrating a dot data generating process according to a second embodiment.

FIG. 10A is a flowchart illustrating a dot data generating process according to a second embodiment. The only point of difference from the first embodiment in FIG. 8 is that S243 and S246 are added between S235 and S280 of the determination process S430. A process of other portion in the dot data generating process is the same as the process of a corresponding portion in FIG. 8. The same portion is not explained and not illustrated. A dot data generating process S170a according to the second embodiment is executed instead of S170 of FIG. 6. The configuration of the printer configured to execute the printing process in FIG. 6 is the same as the configuration of the multifunction peripheral 200 of FIG. 1.

Figure 10B:
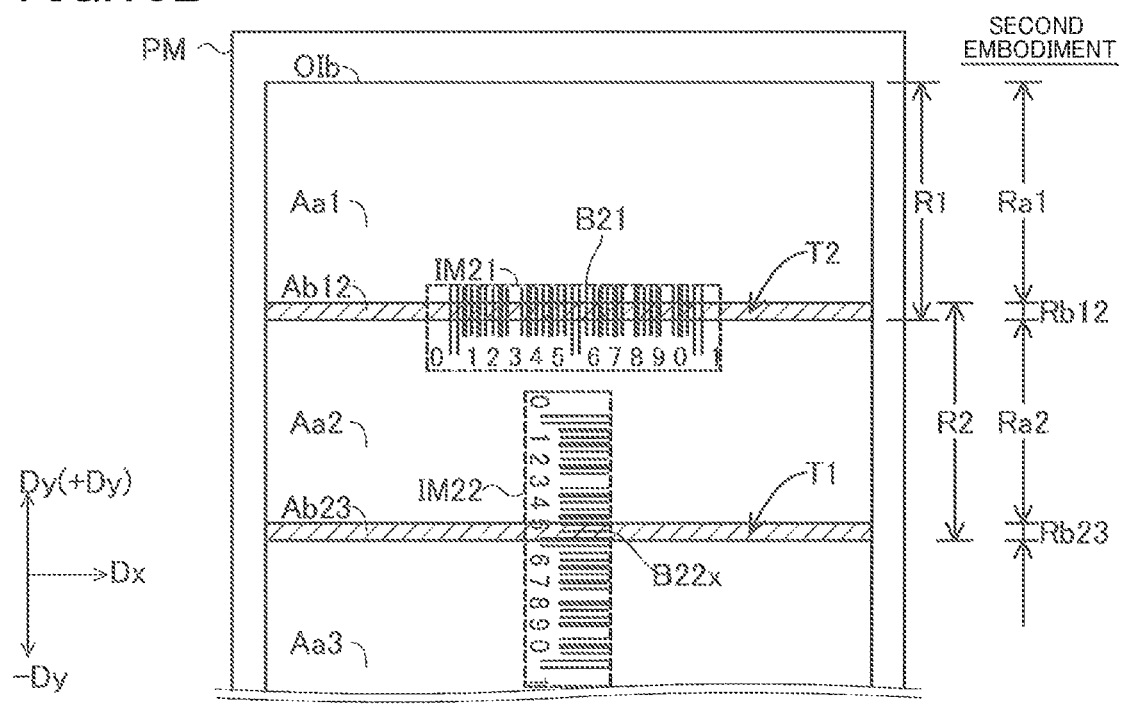
FIG. 10B is a schematic view illustrating an example of an object image.

FIG. 10B is a schematic view illustrating an example of an object image to be printed on the recording sheet PM. An object image OIb includes two objects IM21 and IM22. These objects IM21 and IM22 are both one-dimensional barcode images.

A portion of the first barcode image IM21 is included in the overlapping region Ab12. A plurality of bars of the first barcode image IM21 are perpendicular to the main scanning direction, for example, the Dx direction. The plurality of respective bars in the first barcode image IM21 include portions positioned outside the overlapping region Ab12.

A portion of the second barcode image IM22 is included in the overlapping region Ab23. A plurality of bars in the second barcode image IM22 are parallel to the main scanning direction, for example, the Dx direction. The entire of a specific black bar B22x of the plurality of black bars in the second barcode image IM22 is included in the overlapping region Ab23.

Figure 10C:
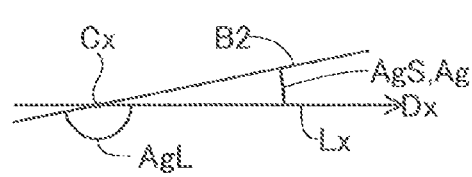
FIG. 10C is a view illustrating an angle Ag.

When the code condition CdC is satisfied at S235 in FIG. 10A (S235: Yes), the processor 210 calculates, at S243, an angle Ag made by a bar of the one-dimensional barcode image overlapping with the target raster line and the main scanning direction, for example, the Dx direction, that angle is also referred to as a first angle Ag. The angle Ag indicates an angle on the recording sheet at the time of printing. FIG. 10C is a schematic view for the angle Ag. In FIG. 10C, a black bar B2 included in the one-dimensional barcode and a straight line Lx parallel to the direction Dx are illustrated. A direction in which the black bar B2 is extended (namely, a direction parallel to the black bar B2) is specified at S165 in FIG. 6. As illustrated in FIG. 10C, the intersecting two lines B2 and Lx form two angles AgS and AgL having apexes disposed at a point of intersection Cx. The processor 210 adopts the angle AgS which is smaller in the two angles AgS and AgL as the angle Ag. Accordingly, the angle Ag is equal to or greater than zero degree and equal to or less than 90 degrees. One angle Ag is associated with one barcode image. When S243 is executed in a process for one raster line relating to one barcode image, the processor 210 may skip S243 in processes for other raster lines overlapping with the same barcode image.

At S246 in FIG. 10A, the processor 210 determines whether a condition Cd1 indicating that the angle Ag is smaller than an angle threshold value Agt is satisfied or not (the angle threshold value Agt is greater than zero degree and less than 90 degrees). When the angle Ag is small, the entire bar can be positioned inside the overlapping region Ab23 like a black bar B22x in the second barcode image IM22 in FIG. 10B. When the angle Ag is large, a portion of the bar may be positioned outside the overlapping region Ab12 like the black bar in the first barcode image IM21. The angle threshold value Agt is experimentally determined in advance such that the condition Cd1 can be satisfied when the entire one bar is included in the overlapping region.

When the angle Ag is equal to or greater than the angle threshold value Agt (S246: No), the flow executed by the processor 210 proceeds to S290. Then, the processor 210 executes density correction by using the second correction value T2 (FIG. 8: S290, S295), and generates raster dot data (S330). For example, when the target raster line is included in the overlapping area Rb12 in FIG. 10B, the angle Ag is almost 90 degrees. In this case, the processor 210 uses the second correction value T2. Accordingly, deviation of density in appearance between the overlapping area Rb12 and the non-overlapping areas Ra1, Ra2 is suppressed. All black bars and white bars in the first barcode image IM21 include portions positioned outside the overlapping area Rb12 (namely, portions included in the non-overlapping area). It is possible to read proper information from the first barcode image IM21 by reading such portions that are the portions positioned outside the non-overlapping area.

When the angle Ag is smaller than the angle threshold value Agt (S246: Yes), the flow executed by the processor 210 proceeds to S280. Then, the processor 210 executes density correction by using the first correction value T1 (FIG. 8: S280, S285), and generates raster dot data at S330. For example, when the target raster line is included in the overlapping area Rb23 in FIG. 10B, the angle Ag is almost zero degree. In this case, the first correction value T1 is used. Accordingly, it is possible to suppress improper reduction in width of the black bar B22x included in the overlapping area Rb23 in the printed object image OIb. As a result, it is possible to read proper information from the second barcode image IM22. Suppose that the second correction value T2 is used, the entire black bar B22x can become thin. As a result, it can be difficult to read proper information from the second barcode image IM22. Such trouble is suppressed according to the present embodiment.

As described above, a particular condition as a condition for using the first correction value T1 is that the code condition CdC (S235) and the condition Cd1 (S246) indicating that the angle Ag is smaller than the angle threshold value Agt are satisfied in the present embodiment. As illustrated in the second barcode image IM22 of FIG. 10B, when the bar of the one-dimensional barcode, the black bar B22x for example, is approximately parallel to the main scanning direction, the Dx direction for example, on the recording sheet PM, the particular condition is satisfied. That is, the particular condition for using the first correction value T1 is satisfied when a first particular condition including the code condition CdC and a first parallel condition indicating that the bar of the one-dimensional barcode is approximately parallel to the main scanning direction, the Dx direction for example, is satisfied. Moreover, as illustrated in the first barcode image IM21, when a bar of the one-dimensional barcode, a black bar B21 for example, is perpendicular to the main scanning direction, the Dx direction for example, the second correction value T2 is used. Then, the degree of reduction in density obtained when the first correction value T1 is used is smaller than the degree of reduction in density obtained when the second correction value T2 is used as illustrated in FIG. 9. As described above, in the first case where the first particular condition is satisfied (S235: Yes, S246: Yes), the controller 299 is configured to determine the degree of reduction in density to a degree smaller than the degree of reduction in density used when the bar of the one-dimensional barcode is perpendicular to the main scanning direction, the Dx direction for example. Accordingly, when the bar of the one-dimensional barcode is parallel to the main scanning direction, the Dx direction for example, it is possible to suppress printing of a light code image in print density. As a result, it is possible to suppress improper reduction in width of elements in the code image, the black bar B22x of FIG. 10B, for example.

Third Embodiment

Figure 11A:
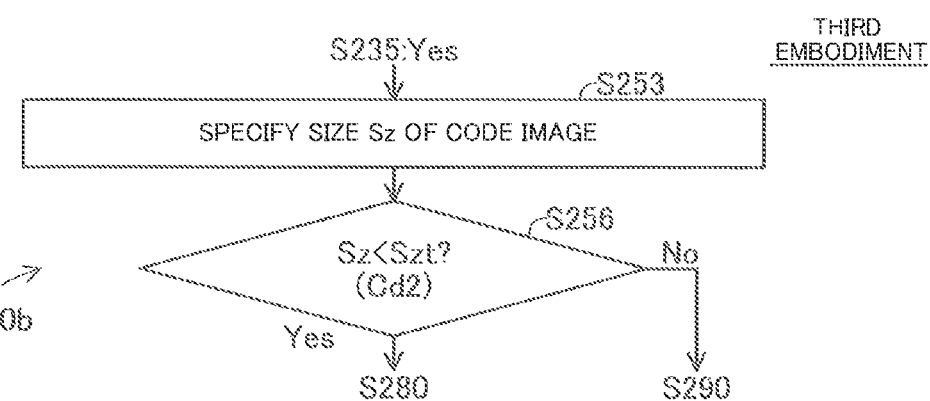
FIG. 11A is a flowchart illustrating a dot data generating process according to a third embodiment.

FIG. 11A is a flowchart illustrating a dot data generating process according to a third embodiment. The only point of difference from the first embodiment of FIG. 8 is that S253 and S256 are added between S235 and S280 of the determination process S430. The process of other portion in the dot data generating process is the same as the process of a corresponding portion in FIG. 8. The same portion is not explained and not illustrated. A dot data generating process S170b according to the present embodiment is executed instead of S170 of FIG. 6. The configuration of the printer executing the printing process in FIG. 6 is the same as the configuration of the multifunction peripheral 200 of FIG. 1.

Figure 11B:
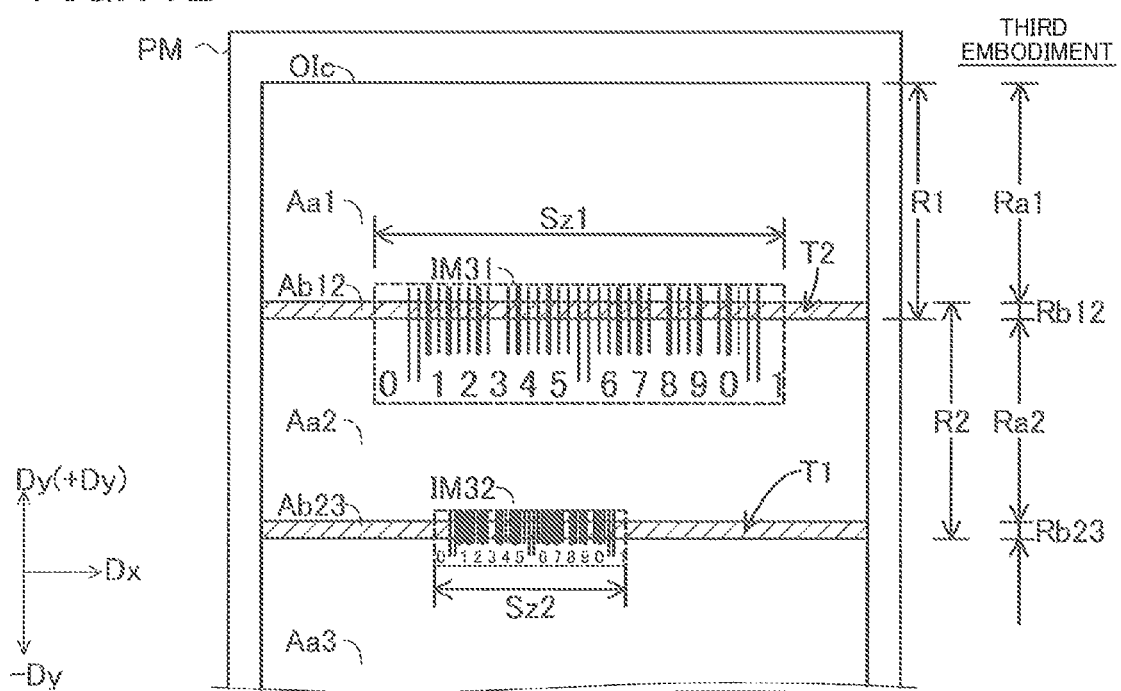
FIG. 11B is a schematic view illustrating an example of an object image.

FIG. 11B is a schematic view illustrating an example of an object image printed on the recording sheet PM. An object image OIc includes two objects IM31 and IM32. Both objects IM31 and IM32 are one-dimensional barcode images. A portion of the first barcode image IM31 is included in the overlapping region Ab12. A portion of the second barcode image IM32 is included in the overlapping region Ab23.

When the code condition CdC is satisfied at S235 in FIG. 11A (S235: Yes), the processor 210 specifies a size Sz of the one-dimensional barcode image overlapping with the target raster line at S253. A first size Sz1 of the first barcode image IM31 and a second size Sz2 of the second barcode image IM32 are illustrated in FIG. 11B. In the present embodiment, the size Sz of the one-dimensional barcode image is a length of a long side of four sides of a rectangular region representing the barcode image. The size Sz is the same as a length of the barcode image in a direction perpendicular to a direction in which bars of the barcode image extend. In an example of FIG. 11B, the first size Sz1 is greater than the second size Sz2. A unit of the size Sz is, for example, the number of print pixels. One size Sz is associated with one barcode image. When S253 is executed in a process for one raster line relating to one barcode image, the processor 210 may skip S253 in processes for other raster lines overlapping with the same barcode image.

At S256 in FIG. 11A, the processor 210 determines whether a condition Cd2 indicating that the size Sz is smaller than a size threshold value Szt is satisfied or not. The size threshold value Szt is greater than zero. When the size Sz of the barcode image is small, a width of each of a plurality of bars in the barcode in the main scanning direction is thinner than a case where the size Sz is large. In a case where density correction is executed based on the second correction value T2, thin black bars become further thinner; accordingly, it can be difficult to read proper information from the printed barcode image. When the size Sz of the barcode image is large, the width of each of the plurality of bars in the barcode in the main scanning direction is thick as compared with the case where the size Sz is small. Accordingly, even when density correction is executed with respect to the large sized barcode image based on the second correction value T2, respective widths of the plurality of bars are less affected by the density correction, as a result, it is possible to read proper information from the printed barcode image. In the example of FIG. 11B, the first size Sz1 is greater than the size threshold value Szt and the second size Sz2 is smaller than the size threshold value Szt.

When the size Sz is equal to or greater than the size threshold value Szt (S256: No), the flow executed by the processor 210 proceeds to S290. Then, the density correction is executed by using the second correction value T2 (FIG. 8: S290, S295), generating the raster dot data at S330. For example, when the target raster line is included in the overlapping area Rb12 in FIG. 11B, the first size Sz1 is greater than the size threshold value Szt; accordingly, the second correction value T2 is used. Therefore, deviation of density in appearance between the overlapping area Rb12 and the non-overlapping areas Ra1, Ra2 is suppressed. Since the first size Sz1 of the first barcode image IM31 is large, the respective widths of the plurality of bars are less affected by the density correction. As a result, it is possible to read proper information from the printed first barcode image IM31.

When the size Sz is smaller than the size threshold value Szt (S256: Yes), the flow executed by the processor 210 proceeds to S280. Then, the density correction is executed by using the first correction value T1 (FIG. 8: S280, S285), generating the raster dot data at S330. For example, when the target raster line is included in the overlapping area Rb23 in FIG. 11B, the second size Sz2 is smaller than the size threshold value Szt; accordingly, the first correction value T1 is used. As a result, it is possible to suppress improper reduction in widths of the plurality of black bars in the second barcode image IM32 included in the overlapping area Rb23 in the printed object image OIc. With this configuration, it is possible to read proper information from the printed second barcode image IM32.

The size threshold value Szt is experimentally determined in advance such that deviation of density in appearance between the overlapping area and the non-overlapping area on the printed image is suppressed and the barcode image included in the overlapping area can be properly printed.

As described above, a particular condition as the condition for using the first correction value T1 is that the code condition CdC (S235) and the condition Cd2 (S256) indicating that the size Sz of the code image is smaller than the size threshold value Szt are satisfied. Also as described with reference to the first barcode image IM31 in FIG. 11B, when the size Sz is equal to or greater than the size threshold value Szt, the second correction value T2 is used. Then, the degree of reduction in density obtained when the first correction value T1 is used is smaller than the degree of reduction in density obtained when the second correction value T2 is used as illustrated in FIG. 9. As described above, the controller 299 is configured to determine the degree of reduction in density to a degree smaller than the degree of reduction in density obtained when the size Sz is equal to or greater than the size threshold value Szt in the first case where the particular condition is satisfied (S235: Yes, S256: Yes). Accordingly, when the size Sz of the one-dimensional barcode is smaller than the size threshold value Szt, the printing of a light code image in print density can be suppressed. As a result, it is possible to suppress improper reduction in width of elements in the code image, the black bars in the second barcode image IM32 in FIG. 11B, for example.

When the size Sz of the barcode image is equal to or greater than the size threshold value Szt, the plurality of respective bars in the barcode are thick. Accordingly, even when the entire specific bar of the one-dimensional bar code is included in the overlapping area like the black bar B22x in FIG. 10B, the width of the bar is less affected by the density correction. As a result, it is possible to suppress improper reduction in width of black bars in the printed image even when the density correction using the second correction value T2 is executed.

Fourth Embodiment

Figure 12A:
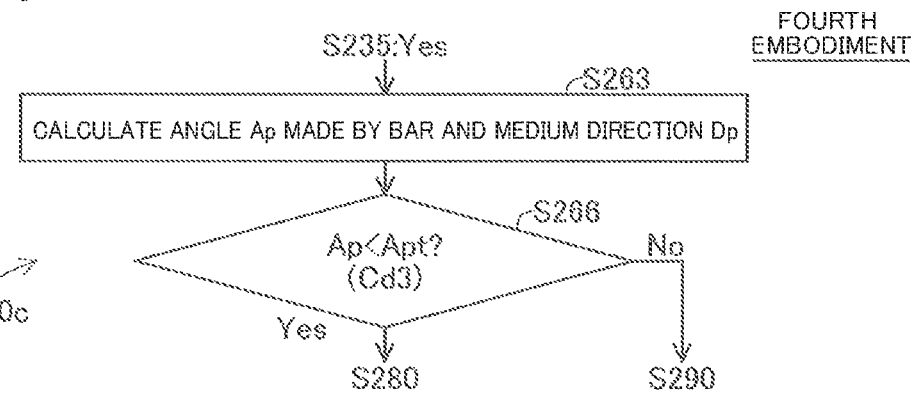
FIG. 12A is a flowchart illustrating a dot data generating process according to a fourth embodiment.

FIG. 12A is a flowchart illustrating a dot data generating process according to a fourth embodiment. The only point of difference from the first embodiment of FIG. 8 is that S263 and S266 are added between S235 and S280 of the determination process S430. The process of other portion in the dot data generating process is the same as the process of a corresponding portion in FIG. 8. The same portion is not explained and not illustrated. A dot data generating process S170c according to the present embodiment is executed instead of S170 of FIG. 6. The configuration of the printer configured to execute the printing process in FIG. 6 is the same as the configuration of the multifunction peripheral 200 of FIG. 1.

Figure 12B:
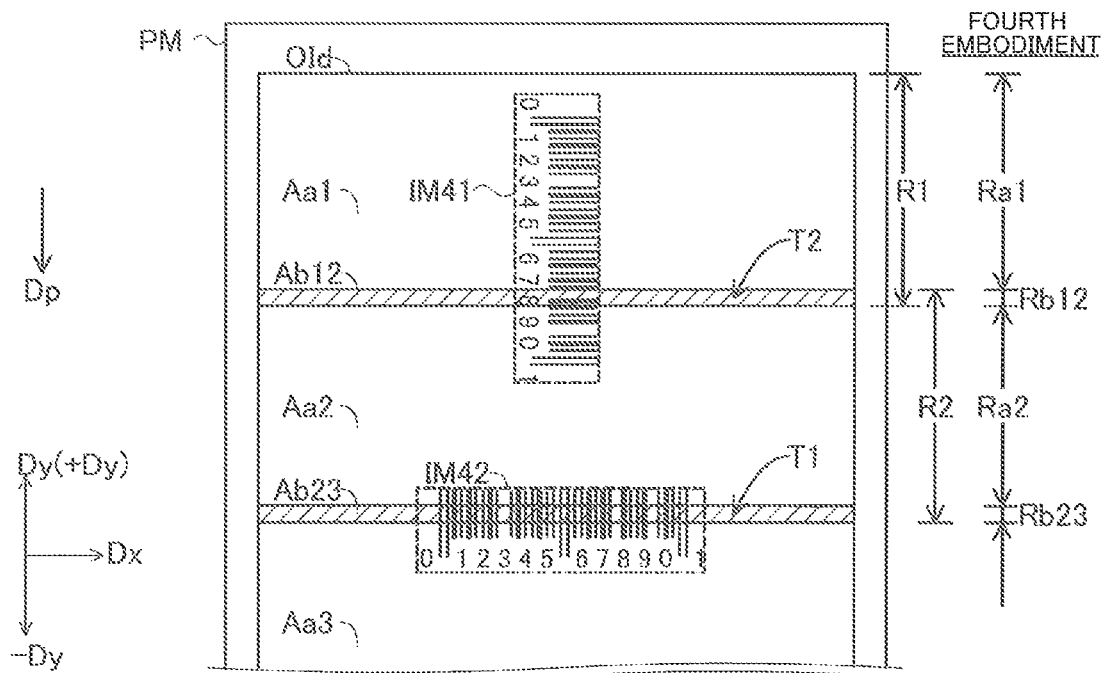
FIG. 12B is a schematic view illustrating an example of an object image.

FIG. 12B is a schematic view illustrating an example of an object image printed on the recording sheet PM. An object image OId includes two objects IM41 and IM42. Both objects IM41 and IM42 are one-dimensional barcode images.

In FIG. 12B, a medium direction Dp is illustrated. The recording sheet PM contains a large number of fibers. A large number of fibers extend almost in the same direction. The medium direction Dp is a direction in which fibers contained in the recording sheet PM extend. The medium direction in which fibers extend is predetermined according to the type of the recording sheet. The type of the recording sheet is designated by the print instruction (FIG. 6: S105). The processor 210 identifies the type of the recording sheet by referring to the print instruction, and identifies the medium direction Dp based on the identified type of the recording sheet. In the example of FIG. 12B, the medium direction Dp is the same as the −Dy direction in a state when the image is printed on the recording sheet PM. Generally, ink tends to bleed in a direction parallel to the medium direction Dp. In the example of FIG. 12B, the ink tends to bleed in a direction parallel to the sub-scanning direction Dy.

A portion of the first barcode image IM41 is included in the overlapping area Ab12. A plurality of bars of the first barcode image IM41 are perpendicular to the medium direction Dp. A portion of the second barcode image IM42 is included in the overlapping region Ab23. A plurality of bars of the second barcode image IM42 are parallel to the medium direction Dp.

Figure 12C:
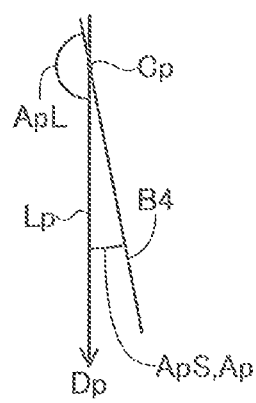
FIG. 12C is a view illustrating an angle Ap.

When the code condition CdC is satisfied at S235 in FIG. 12A (S235: Yes), the processor 210 calculates an angle Ap made by a bar of the one-dimensional barcode image overlapping with the target raster line and the medium direction Dp at S263. The angle is also referred to as a second angle Ap. The angle Ap indicates an angle on the recording sheet at the time of printing. FIG. 12C is a schematic view for the angle Ap. In FIG. 12C, a black bar B4 included in the one-dimensional barcode and a straight line Lp parallel to the medium direction Dp are illustrated. A direction in which the black bar B4 extends (namely, a direction parallel to the black bar B4) is specified at S165 in FIG. 6. As illustrated in FIG. 12C, the intersecting two lines B4 and Lp form two angles ApS and ApL having apexes disposed at a point of intersection Cp. The processor 210 adopts the angle ApS which is smaller in the two angles ApS and ApL as the angle Ap. Accordingly, the angle Ap is equal to or greater than zero degree and equal to or less than 90 degrees. One angle Ap is associated with one barcode image. When S263 is executed in the process for one raster line relating to one barcode image, the processor 210 may skip S263 in the processes for other raster lines overlapping with the same barcode image.

At S266 in FIG. 12A, the processor 210 determines whether a condition Cd3 indicating that the angle Ap is smaller than an angle threshold value Apt is satisfied or not. When the angle Ap is greater than the angle threshold value Apt, the medium direction Dp is a direction intersecting the direction in which the plurality of bars extend as illustrated by bars of the first barcode image IM41 in FIG. 12B. The ink can bleed in a width direction of bars in the printed first barcode image IM 41. That is, the black bars tend to be thick by bleeding of ink. On the other hand, when the angle Ap is less than the angle threshold value Apt, the medium direction Dp is almost parallel to the direction in which the plurality of bars extend as illustrated by bars in the second barcode image IM42. The ink can bleed in the direction in which the bars extend in the printed second barcode image IM42. That is, the black bars do not easily become thick even when the ink bleeds.

When the angle AP is equal to or greater than the angle threshold value Apt (S266: No), the flow executed by the processor 210 proceeds to S290. Then, the processor 210 executes density correction by using the second correction value T2 (FIGS. 8: S290 and S295), and generates the raster dot data (S330). For example, the target raster line is included in the overlapping area Rb12 in FIG. 12B, the angle Ap is almost 90 degrees. In this case, the second correction value T2 is used. Accordingly, deviation of density in appearance between the overlapping area Rb12 and the non-overlapping areas Ra1, Ra2 is suppressed in the printed object image OM. It is also possible to suppress improper reduction in width of black bars included in the overlapping area Rb12 due to bleeding of ink in the direction parallel to the medium direction Dp.

When the angle Ap is smaller than the angle threshold value Apt (S266: Yes), the flow executed by the processor 210 proceeds to S280. Then, the processor 210 executes density correction by using the first correction value T1 (FIG. 8: S280, S285), and generates the raster dot data at S330. For example, when the target raster line is included in the overlapping area Rb23 in FIG. 12B, the angle Ap is almost zero degree. In this case, the first correction value T1 is used. Accordingly, it is possible to suppress improper reduction in width of black bars included in the overlapping area Rb23 in the printed object image OId.

It is noted that the angle threshold value Apt is experimentally determined in advance so that improper reduction in width of black bars of the one-dimensional barcode is suppressed in the printed image.

As described above, the particular condition as the condition for using the first correction value T1 is that the code condition CdC (S235) and the condition Cd3 (S266) indicating that the angle AP is smaller than the angle threshold value Apt are satisfied. As explained with reference to the second barcode image IM42 of FIG. 12B, the particular condition is satisfied when the bar, for example, black bars, of the one-dimensional barcode on the recording sheet PM are parallel to the medium direction Dp. That is, when a third particular condition including the code condition CdC and a second parallel condition indicating that the bars of the one-dimensional barcode are parallel to the medium direction Dp is satisfied, the particular condition for using the first correction value T1 is satisfied. As explained with reference to the first barcode image IM41, the second correction value T2 is used when the bars, for example, the black bars, of the one-dimensional barcode are perpendicular to the medium direction Dp. Then, the degree of reduction in density obtained when the first correction value T1 is used is smaller than the degree of reduction in density obtained when the second correction value T2 is used as illustrated in FIG. 9. As described above, in the first case where the third particular condition is satisfied (S235: Yes, S266: Yes), the controller 299 is configured to determine the degree of reduction in density to a degree smaller than the degree of reduction in density used when the bars of the one-dimensional barcode are perpendicular to the medium direction Dp. Accordingly, when the bars of the one-dimensional barcode are parallel to the medium direction Dp, the printing of a light code image in print density can be suppressed. As a result, it is possible to suppress improper reduction in width of elements in the code image, the black bars in the second barcode image IM42 in FIG. 12B, for example.

Fifth Embodiment

Figure 13:
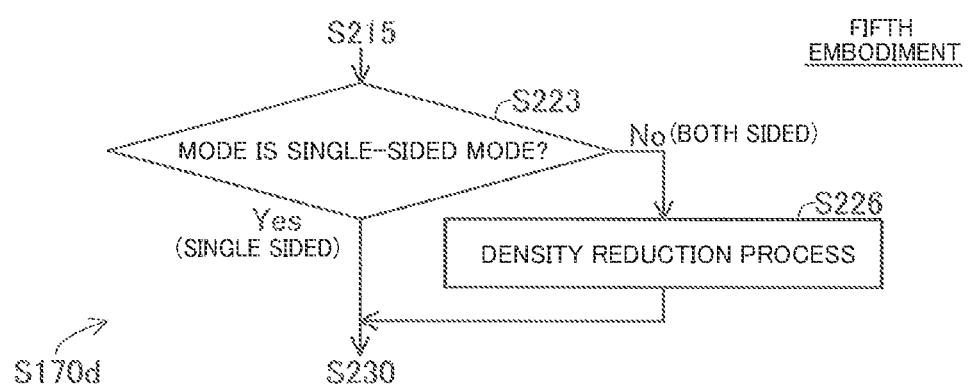
FIG. 13 is a flowchart illustrating a dot data generating process according to a fifth embodiment.

FIG. 13 is a flowchart illustrating a dot data generating process according to a fifth embodiment. The only point of difference from the first embodiment of FIG. 8 is that S223 and S226 are added between S215 and S230 of FIG. 8. The process of other portion in the dot data generating process is the same as the process of a corresponding portion in FIG. 8. The same portion is not explained and not illustrated. A dot data generating process S170d according to the present embodiment is executed instead of S170 of FIG. 6. The configuration of the printer configured to execute the printing process in FIG. 6 is the same as the configuration of the multifunction peripheral 200 of FIG. 1.

In the present embodiment, the controller 299 is configured to control the printing device 400 in a mode selected from a plurality of modes including a double-sided mode in which images should be printed on both sides of the recording sheet PM and a single-sided mode in which the image should be printed on a single side of the recording sheet PM. The second moving device 440 of the printing device 400 is capable of performing automatic double-sided printing. That is, the second moving device 440 includes a sheet feeder, which is not illustrated, that turns over the recording sheet automatically after the image is printed on one side of the recording sheet for printing the images on both sides of the recording sheet PM. The print mode is designated by the print instruction (FIG. 6: S105). The processor 210 can identify the print mode by referring to the print instruction. It is not always necessary that the second moving device 440 is capable of performing the automatic double-sided printing. In this case, the user may turn over the recording sheet after the image is printed on one side of the recording sheet and supply the recording sheet to the printing device 400.

At S223 in FIG. 13, the processor 210 determines whether the print mode designated by the print instruction is the "single-sided mode" or not. When the print mode is the single-sided mode (S223: Yes), the flow executed by the processor 210 proceeds to S230. The process executed in this case is the same as the process of the first embodiment of FIG. 8.

When the print mode is the "double-sided mode" (S223: No), the processor 201 executes a density reduction process at S226. At S226, respective color values of CMYK of all pixels in the target raster line are reduced regardless of whether the target raster line is included in the overlapping area or not. In the present embodiment, the processor 210 calculates processed color values by multiplying respective color values of CMYK by a predetermined coefficient "k" which is less than 1, k=0.9, for example. Then, the flow executed by the processor 210 proceeds to S230. The processor 210 generates dot data by using the processed color values.

As described above, the density of the entire image is reduced in the double-sided mode as compared with the single-sided mode. This is for suppressing the image printed on the opposite side from being seen through the recording sheet PM when one side of the recording sheet PM is observed. Since an amount of ink is reduced by reducing the density, the seen-through of the image is suppressed.

The dot generating process in the present embodiment is the same as the process of FIG. 8 except the point that the density of the entire image is reduced in the double-sided mode. That is, the first generating process S410 is a process of generating raster dot data in the double-sided mode, which represents the first partial-image (the image of the target raster line in this case) with low density as compared with the single-sided mode. The second generating process S420 is the process of generating raster dot data in the double-sided mode, which represents the second partial-image (the image of the target raster line in this case) with low density as compared with the single-sided mode. Then, in the first case (S235: Yes) where the particular condition including the code condition CdC is satisfied in respective modes of the double-sided mode and the single-side mode, the controller 299 is configured to determine the degree of reduction in density to a degree smaller than the degree of reduction in density obtained in the second case (S235: No) in which the second partial-image (the image of the target raster line in this case) does not include the code image in the same manner as the first embodiment of FIG. 8. Accordingly, printing of a light code image in print density can be suppressed. As a result, it is possible to suppress improper reduction in width of elements in the code image, the black bars in FIG. 7, for example.

Sixth Embodiment

Figure 14A:
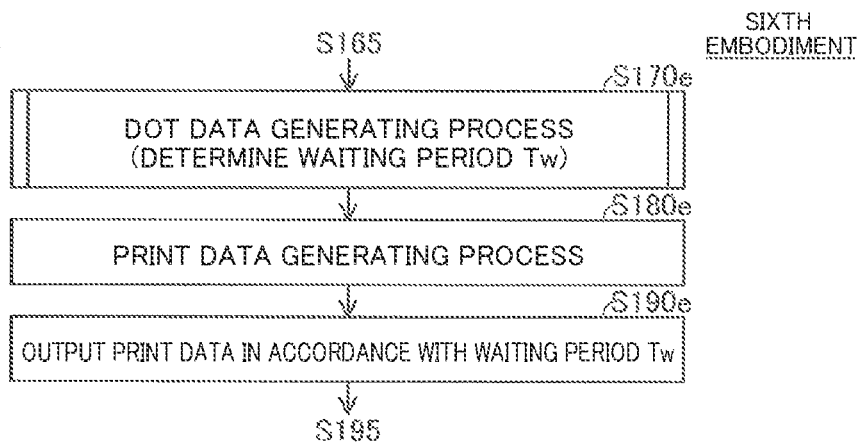
FIG. 14A is a flowchart illustrating a printing process according to a sixth embodiment.

FIG. 14A is a flowchart illustrating a printing process according to a sixth embodiment. The only point of difference from the first embodiment of FIG. 6 is that S170, S180, and S190 are replaced with S170e, S180e, and S190e. In the present embodiment, the controller 299 is configured to adjust a waiting period between the preceding partial printing and the subsequent partial printing. A process of other portion in the printing process is the same as the process of a corresponding portion in FIG. 6. The same portion is not explained and not illustrated. The configuration of the printer configured to execute the printing process is the same as the configuration of the multifunction peripheral 200 of FIG. 1.

In the dot data generating process at S170e, the processor 210 determines the waiting period between two successive partial printings, that is, the preceding partial printing and the subsequent partial printing, in addition to the generation of dot data. The processor 210 determines the waiting period after the partial printing with respect to each of a plurality of partial printings, which will be described below in detail. In a print data generating process at S180e, the processor 210 generates print data including a plurality of combinations of partial printing data, conveyance data, and waiting period data. The waiting period data indicates the waiting period after the partial printing based on the preceding partial print data executed just before. At S190e, the processor 210 outputs print data to the printing device 400 in the same manner as S190 of FIG. 6. Here, the processor 210 outputs partial printing data for next partial printing to the printing device 400 after the waiting period has passed from the timing when the preceding partial printing has completed.

Figure 14B:
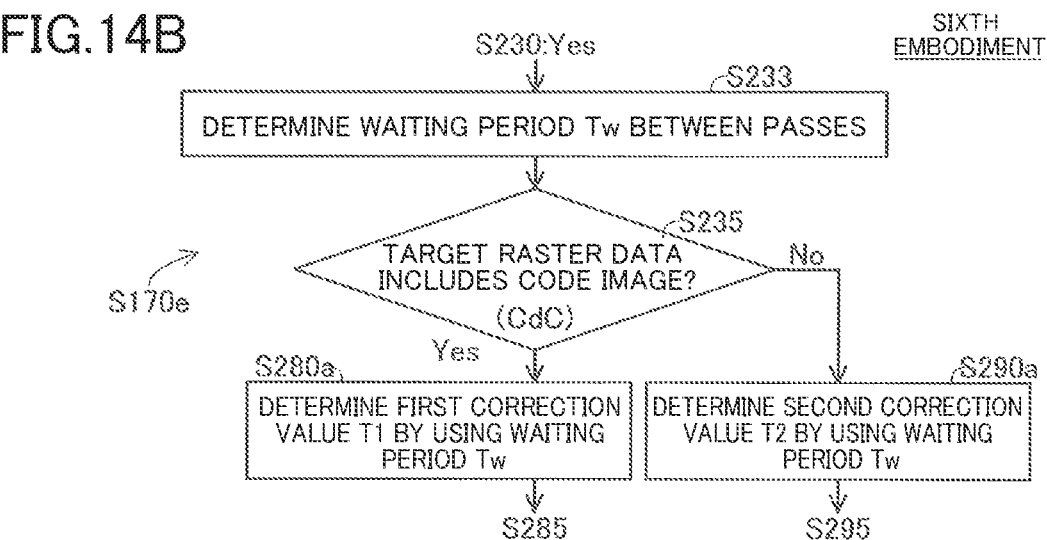
FIG. 14B is a flowchart illustrating a dot data generating process according to the sixth embodiment.

FIG. 14B is a flowchart illustrating a dot data generating process according to the sixth embodiment. There are two points of differences from the first embodiment of FIG. 8. The first difference is that S233 is added between S230 and S235. The second difference is that S280 and S290 in the determination process S430 are respectively replaced with S280a and S290a. The process of other portion of the dot data generating process is the same as the process of a corresponding portion in FIG. 8. The same portion is not illustrated and not explained.

At S233, the processor 210 determines a waiting period Tw between the preceding partial printing and the subsequent partial printing for printing the overlapping area including the target raster line. In the present embodiment, the processor 210 calculates a total color value of CMYK of a plurality of pixels as a print target of the preceding partial printing (also referred to as a preceding pass ink amount) by using object image data. Then, the processor 210 determines the waiting period Tw to a greater value as the preceding pass ink amount becomes greater. Generally, when a large amount of ink is consumed for a short period of time, a delay may occur in new supply of ink from the ink cartridges KC, YC, CC, and MC to the head 410. When the delay occurs in supply of ink, an image to be printed can be improperly light in print density. Furthermore, in a state in which ink is not dried on the recording sheet, a portion of the recording sheet to which ink adheres tends to be deformed. When subsequent partial printing is executed in the state in which the recording sheet is deformed, positions of dots may be deviated on the recording sheet. In order to suppress such trouble, the greater the amount of preceding pass ink becomes, the longer the waiting period Tw becomes in the present embodiment. Accordingly, the delay in supply of ink is suppressed at the time of starting the subsequent partial printing. Moreover, the drying of ink on the recording sheet is accelerated; therefore, deformation of the recording sheet is suppressed at the time of starting the subsequent partial printing. A correspondence relationship between the preceding pass ink amount and the waiting period Tw is experimentally determined in advance such that the image can be properly printed. For example, the waiting period Tw may be in proportion to the preceding pass ink amount.

It is noted that one waiting period Tw is associated with one overlapping area (namely, one combination of preceding partial printing and subsequent partial printing). When S233 is executed in the process for one raster line relating to one overlapping area, the processor 210 may skip S233 in the processes for other raster lines included in the same overlapping area.

S235 is the same as S235 in FIG. 8. When the code condition CdC is satisfied (S235: Yes), the processor 210 determines the first correction value T1 by using the waiting period Tw at S280a. Then, the flow proceeds to S285. When the code condition CdC is not satisfied (S235: No), the processor 210 determines the second correction value T2 by using the waiting period Tw at S290a. Then, the flow proceeds to S295.

Figure 14C:
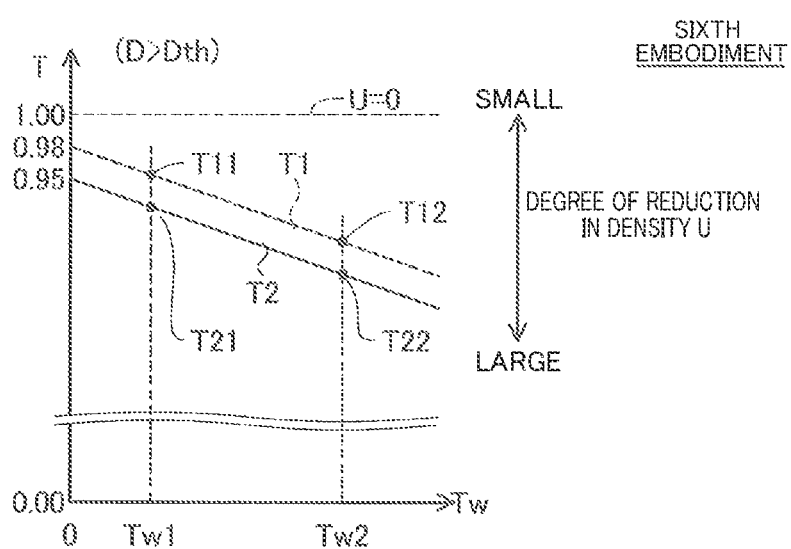
FIG. 14C is a graph representing an example of relationship between a waiting period Tw and a correction value T.

FIG. 14C is a graph representing an example of relationship between the waiting period Tw and the correction value T. The horizontal axis represents the waiting period Tw and the vertical axis represents the correction value T. The graph represents the correction value T used when the total color value D in FIG. 9 is greater than the threshold value Dth. When the total color value D is equal to or less than the threshold value Dth, the correction values T1 and T2 are set to 1.00, though not illustrated in FIG. 14C.

As illustrated in FIG. 14C, the greater the waiting period Tw becomes, the smaller the correction values T1 and T2 become. Then, when the waiting period Tw is the same, the correction value T2 is smaller than the correction value T1 regardless of the waiting period Tw. For example, when the waiting period Tw is a first time Tw1, the first correction value T1 is a first value T11. When the waiting period is a second time Tw2, which is greater than the first time Tw1, the first correction value T1 is a second value T12. Then, the first value T11 is greater than the second value T12. The same applies to the second correction value T2. The second correction value T2 is a first value T21 in the first time Tw1, and the second correction value T2 is a second value T22 in the second time Tw2, in which the first value T21 is greater than the second value T22.

As described above, the greater the waiting period Tw becomes, the smaller the correction values T1 and T2 become, that is, the greater the degree of reduction in density becomes. The reason thereof is as follows. As the waiting period Tw becomes greater, dots formed by the preceding partial printing tend to bleed and spread on the recording sheet PM. That is, the density of the image in appearance in the overlapping area tends to be greater in the printed image as the waiting period Tw becomes greater. For example, the black bars of the barcode tend to be thick. Accordingly, when the waiting period Tw is long, the degree of reduction in density is preferably large as compared with a case where the waiting period Tw is short. Accordingly, the greater the waiting period Tw becomes, the smaller the correction values T1 and T2 become, that is, the larger the degree of reduction in density becomes. Accordingly, the increase in density of the image in appearance can be suppressed.

As explained above, the controller 299 is configured to adjust the waiting period Tw between the partial printing and the subsequent partial printing according to the present embodiment (FIG. 14A, FIG. 14B). Also according to the present embodiment, the particular condition as the condition for using the first correction value T1 is that the code condition CdC (S235) is satisfied. Then, in the first case where the particular condition is satisfied (S235: Yes), the controller 299 is configured to determine the degree of reduction in density (T11) used when the waiting period Tw is the first time Tw1 to be a degree smaller than the degree of reduction in density (T12) used when the waiting period Tw is the second time Tw2 which is greater than the first time Tw1, that is the first value T11 is greater than the second value T12, as illustrated in FIG. 14C. Accordingly, when the waiting period Tw is short, printing of a light code image in print density can be suppressed. Moreover, when the waiting period Tw is long, the increase in density of the image in appearance can be suppressed.

Also according to the present embodiment, the controller 299 adjusts the second correction value T2 in the similar manner to the first correction value T1. Specifically, the controller 299 is configured to determine the degree of reduction in density used when the waiting period Tw is the first time Tw1 to be a degree smaller than the degree of reduction in density used when the waiting period Tw is the second time Tw2 which is greater than the first time Tw1, that is, the first value T21 is greater than the second value T22, as illustrated in FIG. 14C. Accordingly, variation of density of the image in appearance in the overlapping area based on the waiting period Tw is suppressed in the printed image.

Seventh Embodiment

Figure 15A:
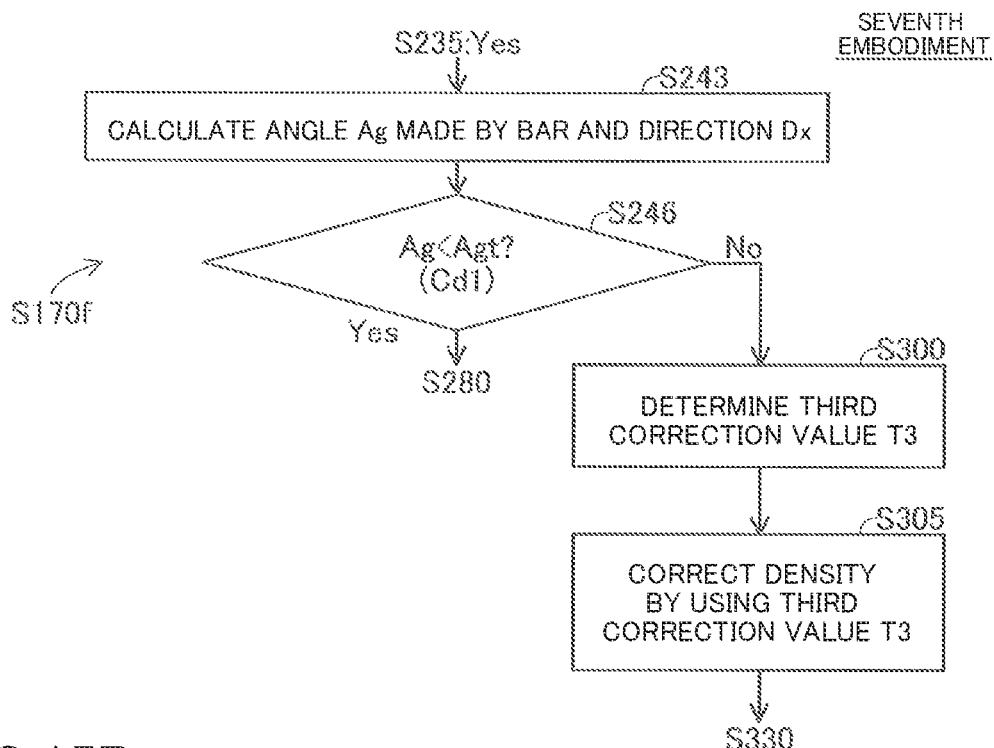
FIG. 15A is a flowchart illustrating a dot data generating process according to a seventh embodiment.

FIG. 15A is a flowchart illustrating a dot data generating process according to a seventh embodiment. The only point of difference from the second embodiment of FIG. 10A is that processes S300 and S305 executed for a case where the condition Cd1 is not satisfied is added. The process of other portion in the dot data generating process is the same as the process of a corresponding portion in FIG. 10A. The same portion is not explained and not illustrated. A dot data generating process S170f according to the present embodiment is executed instead of S170 of FIG. 6. The configuration of the printer executing the printing process in FIG. 6 is the same as the configuration of the multifunction peripheral 200 of FIG. 1.

Figure 15B:
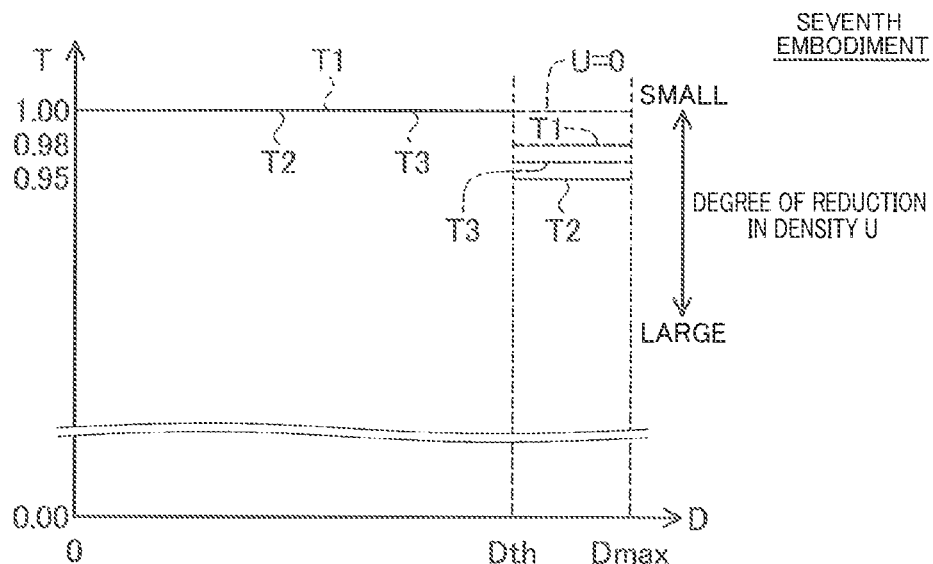
FIG. 15B is a graph representing an example of correction values.

In a case where the code condition CdC is satisfied (S235: Yes) and the condition Cd1 is not satisfied (S246: No), the processor 210 determines a third correction value T3 at S300. FIG. 15B is a graph representing an example of correction values. The only point of difference from the graph of FIG. 9 is that the third correction value T3 is added. As illustrated in FIG. 15B, when the total color value D is equal to or less than the threshold value Dth, the third correction value T3 is set to 1.00. When the total color value D is greater than the threshold value Dth, the third correction value T3 is determined to be a value smaller than the first correction value T1 and greater than the second correction value T2. The third correction value T3 is determined by each pixel.

At S305 in FIG. 15A, the processor 210 executes density correction of a plurality of respective pixels in the target raster line by using the third correction value T3. The only point of difference from S285 and S295 in FIG. 8 is that the third correction value T3 is used instead of the correction values T1 and T2. After S305, the flow executed by the processor 210 proceeds to S330.

As described above, in the present embodiment, even when the target raster line included in the overlapping area includes the code image (FIG. 8: S230: Yes, S235: Yes), the controller 299 corrects the density by using the third correction value T3 different from the first correction value T1 and the second correction value T2 in a case where the angle Ag is equal to or larger than the angle threshold Agt (FIG. 15A: S246: No). For example, when the target raster line is included in the overlapping area Rb12 of FIG. 10B, the angle Ag is almost 90 degrees. In this case, a determination result of S246 is No; therefore, the controller 299 uses the third correction value T3. The degree of reduction in density obtained when the first correction value T1 is used is smaller than the degree of reduction in density obtained when the third correction value T3 is used as illustrated in FIG. 15B. As described above, in the present embodiment, in the first case where the first particular condition including the code condition Cdc and the first parallel condition indicating that the bar of the one-dimensional barcode is parallel to the main scanning direction, for example, the Dx direction, is satisfied (S235: Yes, S246: Yes), the controller 299 is configured to determine the degree of reduction in density to be a degree smaller than the degree of reduction in density obtained when the bar of the one-dimensional barcode is perpendicular to the main scanning direction, for example, the Dx direction, in the same manner as the second embodiment of FIGS. 10A to 10C.

As explained above, when the target raster line included in the overlapping area includes the code image (FIG. 8: S230: Yes, S235: Yes) and the angle Ag is equal to or greater than the angle threshold value Agt (FIG. 15A: S246: No), the correction value used for density correction is preferably the third correction value T3 which is different from the second correction value T2 used when the target raster line does not include the code image (S235: No). In this case, the controller 299 selects the correction value from three kinds of correction values T1, T2, and T3 based on the target raster line. The controller 299 can execute density correction suitable for the image as compared with the case where the correction value is selected from two kinds of correction values T1 and T2.

Modifications

The relationship between the correction values T1, T2, T3 and the total color value D may be other various relationships instead of the relationships illustrated in FIG. 9 and FIG. 15B. For example, the processor 210 may adjust the correction values T1, T2, and T3 in three or more stages, not limited to two stages, in accordance with variation of the total color value D. When the total color value D is increased, the correction values T1, T2, and T3 may be smoothly decreased. The processor 210 may also use various values indicating the density of the pixel instead of the total color value D. For example, the processor 210 may determine the correction value by using the maximum values in color values of CMYK. The correction values T1, T2, and T3 may be fixed values regardless of the color of the pixel, for example, the total color value D.

In any case, when the waiting period Tw is adjusted as in the sixth embodiment illustrated in FIGS. 14A and 14B, it is preferable that the correction values, for example, the correction values T1, T2 and T3, become small as the waiting period Tw becomes great. That is, it is preferable that the degree of reduction in density becomes great as the waiting period Tw becomes great. Here, a range of color of pixels in which the correction value changes in accordance with the waiting period Tw may be a range such as D>Dth. Alternatively, the correction value may change in accordance with the waiting period Tw regardless of the color of pixels.

The particular condition for using the first correction value T1 may be other various conditions instead of the conditions in the above respective embodiments. For example, the particular condition may include satisfaction of one or more conditions arbitrarily selected from the condition Cd1 in FIG. 10A, the condition Cd2 in FIG. 11A, and the condition Cd3 in FIG. 12A in addition to satisfaction of the code condition CdC at S235 in FIG. 8. Such particular condition may be applied to the fifth embodiment of FIG. 13 and the sixth embodiment of FIG. 14B.

In any case, even when the target raster line in the overlapping area includes at least a portion of the code image, the controller 299 may correct the density by using the third correction value T3 different from the first correction value T1 and the second correction value T2 in the case where the particular condition is not satisfied as in the seventh embodiment of FIG. 15A. Here, the second correction value T2 is a correction value used when the target raster line in the overlapping area does not include the code image. Then, the degree of reduction in density based on the first correction value T1 is preferably smaller than the degree of reduction in density based on the third correction value T3.

As explained with reference to FIG. 9 and so on, the smaller the correction value T (for example, the correction values T1, T2, and T3) becomes, the larger the degree of reduction in density becomes. Here, the degrees of reduction in density can be compared between two kinds of correction values T, for example, the correction values T1 and T2, as follows. In the case where the first correction value T1 differs from the second correction value T2 in at least a range in color of pixels (for example, at least a range of the total color value D) as in the example of FIG. 9, the degree of reduction in density by the second correction value T2 having a smaller value becomes larger than the degree of reduction in density by the first correction value T1 having a greater value. The density correction process can be other arbitrary process instead of the process using the correction values T. For example, it is possible to correct color values of CMYK by using a tone curve.

In any case, the density of the image can be specified by observing the entire image formed by a plurality of pixels, not one pixel. For example, optical density obtained by measuring the printed image is a good index value for the density of the image. Suppose that printing without density correction (for example, printing within the non-overlapping area) and printing with density correction (for example, printing within the overlapping area) are executed based on the same image data. A difference obtained by subtracting optical density of the image printed with the density correction from optical density of the image printed without density correction can be adopted as an index value for the degree of reduction in density.

The first correction value T1 in FIG. 9 and so on may be 1.00 regardless of color of pixels (for example, the total color value D). In this case, a degree of reduction in density U represented by the first correction value T1 is zero indicating that the density is not reduced. Here, the process of S280 and S285 may be omitted in the dot data generating process in FIG. 8 and so on. That is, when the particular condition relating to the target raster line within the overlapping area is satisfied, the processor 210 generates dot data without executing density correction at S330. Also in this case, the processor 210 switches the degree of reduction in density in accordance with whether the particular condition is satisfied or not. To omit density correction when the particular condition is satisfied means that the degree of reduction in density is determined to be zero.

The correction value T, for example, the correction values T1, T2, and T3, may be experimentally determined in advance such that deviation of density in appearance between the overlapping area and the non-overlapping area on the printed image is suppressed and such that the code image included in the overlapping area is properly printed. As described above, the correction value T can be different according to characteristics of ink. For example, when the code image is printed, a plurality of pixels of the same color can be successive such as a plurality of pixels representing the black bars Bk in FIG. 7 of the barcode. In the case where ink tends to bleed on the recording sheet PM, ink tends to spread among the plurality of successive pixels of the same color; therefore, a minute shape of the image, for example, the black bars Bk, tends to be thick. In this case, the correction value T1 may be smaller than the correction value T2, which is different from the embodiments of FIG. 9 and so on.

Other various methods can be adopted as the method for determining the waiting period Tw instead of the method explained at S233 of FIG. 14B. For example, an ink consumption amount, for example, the maximum value, per unit time in the preceding partial printing, or an ink amount, for example, the maximum value, per unit area in the preceding partial printing may be used instead of the preceding pass ink amount.

The code image specified at S165 of FIG. 6 is not limited to the image of the one-dimensional code such as the bar code, but may be an image of a two-dimensional code such as a QR code. The processor 210 may also specify the code image by using other image data, for example, input image data, indicating the object image instead of using the object image data. The method for specifying the code image may be an arbitrary method.

In any case, the size Sz specified at S253 of FIG. 11A may have various values having a relationship with the size of the code image. For example, when the rectangular region is specified as the code image, the length of a long side or the length of a short side may be used as the size Sz. Moreover, the maximum diameter of a region of the code image may be used as the size Sz. For example, when the region of the code image is a rectangular region, the maximum diameter is a length of a diagonal line. An area, for example, the number of pixels, of the area of the code image may be used as the size Sz.

Other various processes may be adopted as the printing process instead of the process explained in FIG. 6 and so on. For example, in the dot data generating process of FIG. 8 and so on, the controller 299 generates dot data of one raster line as a one-time loop process. Alternatively, the controller 299 may generate dot data of successive N (N is an integer of 2 or more) raster lines at the one-time loop process. The processor 210 may adjust parameters such as the width of a print target area in the sub-scanning direction Dy of partial printing, and the conveying amount between the preceding partial printing and the subsequent partial printing based on the object image. The controller 299 may output generated partial print data to the printing device 400 before generation of the entire print data is completed.

Other various configurations may be adopted as the configuration of the printing device 400 instead of the configuration illustrated in FIG. 1 to FIG. 3. The total number of inks which can be used may be 1 or more arbitrary numbers. For example, the printing device 400 may use only ink of black K. The number of dot forming states may be 2 or more arbitrary numbers including "without dot" and "with dots" of one or more. The total number of nozzles and the nozzle pitch may differ according to each ink. The first moving device 430 may be configured to move the recording sheet PM instead of the head 410. The second moving device 440 may be configured to move the head 410 instead of the recording sheet PM. The printing medium may be other kinds of media such as cloth and film instead of the recording sheet PM. In any case, the controller 299 is preferably execute the dot data generating process explained in FIG. 8 and so on relating to at least one ink.

Various configurations including the printing device and the controller may be adopted as the configuration of the printer instead of the configuration of the multifunction peripheral 200 of FIG. 1. For example, the scanner 280 may be omitted. That is, the printer may be a single-function printer. Moreover, the controller configured to control the printing device to print images may be an external terminal device, for example, a computer, connected to the printing device 400 instead of the device mounted on the same housing as the printing device 400 like the controller 299. The processor of the terminal device executes a control process, for example, S105 to S190 of FIG. 6, for printing by executing, for example, a printer driver program. It is also preferable that a plurality of devices, for example, computers, capable of communicating with one another through a network may provide functions of the control process as a whole by sharing functions of the control process for printing. That is, a system having these devices corresponds to the controller.

In the above respective embodiments, a part of configurations realized by hardware may be replaced with software. In contrast, a part or all of configurations realized by software can be replaced with hardware. For example, the function of executing the dot data generating process can be realized by a dedicated hardware circuit, for example, ASIC.

In a case where a part or all of functions of the present disclosure is realized by a computer program, the program can be provided in a form being stored in a recording medium readable by a computer, for example, non-transitory recording medium. The program can be used in a state of being stored in the recording medium (computer-readable recording medium) which is the same as or different from the recording medium at the time of providing. The "computer-readable recording media" are not limited to portable recording media such as a memory card or a CD-ROM, but an internal storage device in the computer such as various ROMs and an external storage device connected to the computer such as a hard disc drive can be included.

The present disclosure has been explained above based on the embodiments and the modifications. The above embodiments of the disclosure are made for making the present disclosure easily understood and do not limit the present disclosure. Various modifications and alterations may occur in the present disclosure without departing from the gist thereof, and equivalents thereof are included in the present disclosure.

What is claimed is:

1. A printer, comprising:
a printing device including:
a print head having a plurality of nozzles arranged in a first direction and configured to discharge ink;
a first moving device configured to execute main scanning of moving the print head relatively with respect to a printing medium in a second direction intersecting the first direction; and
a second moving device configured to execute sub scanning of moving the printing medium relatively with respect to the print head in the first direction; and
a controller configured to:
obtain object image data of an object image including a code image having a first area and a second area, brightness of which is different from brightness of the first area, the code image representing information by the first area and the second area;
specify the code image included in the object image;
generate dot data, by using the object image data, in which each of a plurality of pixels has information representing dot forming states of the ink; and
control the printing device to execute partial printing and the main scanning a plurality of times respectively so as to print the object image on the printing medium, the partial printing being printing in which a plurality of dots are formed on the printing medium based on the dot data by discharging the ink from the print head while the main scanning is executed,
wherein a plurality of print target areas includes a first print target area and a second print target area which are two print target areas adjacent to each other in the first direction and overlapping to each other, the plurality of print target areas respectively corresponding to the plurality of times of the partial printing on the printing medium,
wherein the controller is configured to:
generate first partial-dot-data of the dot data by executing a first generating process with respect to first partial-image data of the object image data, the first partial-image-data corresponding to a first partial-image that is an image positioned within a non-overlapping area that is an area except for an overlapping area in a total area of the first print target area and the second print target area, the overlapping area being an area where the first print target area and the second print target area overlap to each other, and
generate second partial-dot-data of the dot data by executing a second generating process with respect to second partial-image-data of the object image data, the second partial-image-data corresponding to a second partial-image that is an image positioned within the overlapping area, the second generating process being a process of reducing density of a partial-image represented by partial-dot-data, a degree of reduction of the partial-image in density by the first generating process is equal to or less than a degree of reduction of the partial-image in density by the second generating process, and
wherein, in the second generating process, the controller is configured to determine a degree of reduction in density by the second generating process to a first degree of reduction in a first case where a particular condition including a code condition that is satisfied when the second partial-image includes at least a portion of the code image is satisfied, and determine the degree of reduction in density by the second generating process to a second degree of reduction that is different from the first degree of reduction in a second case where the second partial-image does not include the code image.

2. The printer according to claim 1,
wherein, in the first case, the controller is configured to determine the degree of reduction in density by the second generating process to be zero indicating that the density is not reduced, or to the first degree of reduction in density that is less than the second degree of reduction in density in the second case.

3. The printer according to claim 1, wherein the code image is a one-dimensional barcode.

4. The printer according to claim 3, wherein the particular condition is satisfied when a first particular condition including the code condition and a first parallel condition that is satisfied when bars of the one-dimensional barcode are approximately parallel to the second direction on the printing medium is satisfied.

5. The printer according to claim 2, wherein the code image is a one-dimensional barcode, wherein the particular condition is satisfied when a first particular condition including the code condition and a first parallel condition that is satisfied when bars of the one-dimensional barcode are approximately parallel to the second direction on the printing medium is satisfied, and wherein, in the first case where the first particular condition is satisfied, the controller is configured to determine the degree of reduction in density by the second generating process to be zero, or the first degree of reduction that is less than the second degree of reduction in density determined when the bars of the one-dimensional barcode are perpendicular to the second direction.

6. The printer according to claim 1, wherein the particular condition is satisfied when a second particular condition including the code condition and a size condition that is satisfied when the size of the code image is less than a threshold value is satisfied.

7. The printer according to claim 6, wherein, in the first case where the second particular condition is satisfied, the controller is configured to determine the degree of reduction in density by the second generating process to be zero, or the first degree that is less than the second degree of reduction in density determined when the size of the code image is equal to or greater than the threshold value.

8. The printer according to claim 1, wherein the code image is a one-dimensional barcode, and wherein the particular condition is satisfied when a third particular condition including the code condition and a second parallel condition that is satisfied when bars of the one-dimensional barcode are approximately parallel to a medium direction that is associated with the printing medium in advance on the printing medium is satisfied.

9. The printer according to claim 8, wherein, in the first case where the third particular condition is satisfied, the controller is configured to determine the degree of reduction in density by the second generating process to be zero, or the first degree that is less than the second degree of reduction in density determined when the bars of the one-dimensional barcode are perpendicular to the medium direction.

10. The printer according to claim 1, wherein the controller is configured to control the printing device in a mode selected from a plurality of modes including a double-sided mode in which images are printed on both sides of the printing medium and a single-sided mode in which an image is printed on a single side of the printing medium, wherein the first generating process is a process of generating the first partial-dot-data such that the density of the first partial-image represented by the first partial-dot-data in the double-sided mode is less than that of the single-sided mode, wherein the second generating process is a process of generating the second partial-dot-data such that the density of the second partial-image represented by the second partial-dot-data in the double-sided mode is less than that of the single-sided mode, and, wherein, in the first case, the controller is configured to determine the degree of reduction in density by the second generating process to be zero indicating that the density is not reduced, or to the first degree that is less than the second degree of reduction in density determined in the second case, when the controller prints the object image on the printing medium in each of the double-sided mode and the single-sided mode.

11. The printer according to claim 1, wherein the controller is configured to adjust a length of a waiting period between two successive partial printings, and wherein, in the first case, the controller is configured to determine the degree of reduction in density by the second generating process determined when the waiting period is a first period to a degree that is less than a degree of reduction in density determined when the waiting period is a second time that is longer than the first time.

12. A non-transitory storage medium storing a plurality of instructions readable by a computer of a printer, the printer including a print head having a plurality of nozzles arranged in a first direction and configured to discharge ink, a first moving device configured to execute main scanning of moving the print head relatively with respect to a printing medium in a second direction intersecting the first direction, and a second moving device configured to execute sub scanning of moving the printing medium relatively with respect to the print head in the first direction,
wherein, when executed by the computer, the plurality of instructions cause the printer to:
obtain object image data of an object image including a code image having a first area and a second area, brightness of which is different from brightness of the first area, the code image representing information by the first area and the second area;
specify the code image included in the object image;
generate dot data, by using the object image data, in which each of a plurality of pixels has information representing dot forming states of the ink; and
control the printing device to execute partial printing and the main scanning a plurality of times respectively so as to print the object image on the printing medium, the partial printing being printing in which a plurality of dots are formed on the printing medium based on the dot data by discharging the ink from the print head while the main scanning is executed,
wherein a plurality of print target areas includes a first print target area and a second print target area which are two print target areas adjacent to each other in the first direction and overlapping to each other, the plurality of print target areas respectively corresponding to the plurality of times of the partial printing on the printing medium,
wherein, when executed by the computer, the plurality of instructions cause the printer to:

generate first partial-dot-data of the dot data by executing a first generating process with respect to first partial-image data of the object image data, the first partial-image-data corresponding to a first partial-image that is an image positioned within a non-overlapping area that is an area except for an overlapping area in a total area of the first print target area and the second print target area, the overlapping area being an area where the first print target area and the second print target area overlap to each other, and generate second partial-dot-data of the dot data by executing a second generating process with respect to second partial-image-data of the object image data, the second partial-image-data corresponding to a second partial-image that is an image positioned within the overlapping area, the second generating process being a process of reducing density of a partial-image represented by partial-dot-data, a degree of reduction of the partial-image in density by the first generating process is equal to or less than a degree of reduction of the partial image in density the second generating process, and wherein, when executed by the computer, the plurality of instructions cause the printer to, in the second generating process, determine a degree of reduction in density by the second generating process to a first degree of reduction in a first case where a particular condition including a code condition that is satisfied when the second partial-image includes at least a portion of the code image is satisfied, and determine the degree of reduction in density by the second generating process to a second degree of reduction that is different from the first degree of reduction in a second case where the second partial-image does not include the code image.

13. A control method for controlling a printer, the printer including a print head having a plurality of nozzles arranged in a first direction and configured to discharge ink, a first moving device configured to execute main scanning of moving the print head relatively with respect to a printing medium in a second direction intersecting the first direction, and a second moving device configured to execute sub scanning of moving the printing medium relatively with respect to the print head in the first direction, the control method comprising the steps of:

obtaining object image data of an object image including a code image having a first area and a second area, brightness of which is different from brightness of the first area, the code image representing information by the first area and the second area;

specifying the code image included in the object image;

generating dot data, by using the object image data, in which each of a plurality of pixels has information representing dot forming states of the ink; and controlling the printing device to execute partial printing and the main scanning a plurality of times respectively so as to print the object image on the printing medium, the partial printing being printing in which a plurality of dots are formed on the printing medium based on the dot data by discharging the ink from the print head while the main scanning is executed, wherein a plurality of print target areas includes a first print target area and a second print target area which are two print target areas adjacent to each other in the first direction and overlapping to each other, the plurality of print target areas respectively corresponding to the plurality of times of the partial printing on the printing medium, wherein the control method includes the steps of:

generating first partial-dot-data of the dot data by executing a first generating process with respect to first partial-image data of the object image data, the first partial-image-data corresponding to a first partial-image that is an image positioned within a non-overlapping area that is an area except for an overlapping area in a total area of the first print target area and the second print target area, the overlapping area being an area where the first print target area and the second print target area overlap to each other, and generating second partial-dot-data of the dot data by executing a second generating process with respect to second partial-image-data of the object image data, the second partial-image-data corresponding to a second partial-image that is an image positioned within the overlapping area, the second generating process being a process of reducing density of a partial-image represented by partial-dot-data, a degree of reduction of the partial-image in density by the first generating process is equal to or less than a degree of reduction of the partial-image in density by the second generating process, and wherein, in the second generating process, a degree of reduction in density by the second generating process is determined to a first degree of reduction in a first case where a particular condition including a code condition that is satisfied when the second partial-image includes at least a portion of the code image is satisfied, and the degree of reduction in density by the second generating process is determined to a second degree of reduction that is different from the first degree of reduction in a second case where the second partial-image does not include the code image.

* * * * *

UNITED STATES PATENT AND TRADEMARK OFFICE
CERTIFICATE OF CORRECTION

| | | |
|---|---|---|
| PATENT NO. | : 11,663,432 B2 | Page 1 of 1 |
| APPLICATION NO. | : 17/375130 | |
| DATED | : May 30, 2023 | |
| INVENTOR(S) | : Satoru Arakane | |

It is certified that error appears in the above-identified patent and that said Letters Patent is hereby corrected as shown below:

In the Claims

Column 35, Claims 3, 4 and 5, Lines 4-28 should read:
3. The printer according to claim 2,
wherein the code image is a one-dimensional barcode,
wherein the particular condition is satisfied when a first particular condition including the code condition and a first parallel condition that is satisfied when bars of the one-dimensional barcode are approximately parallel to the second direction on the printing medium is satisfied, and
wherein, in the first case where the first particular condition is satisfied, the controller is configured to determine the degree of reduction in density by the second generating process to be zero, or the first degree of reduction that is less than the second degree of reduction in density determined when the bars of the one-dimensional barcode are perpendicular to the second direction.
4. The printer according to claim 1,
wherein the code image is a one-dimensional barcode.
5. The printer according to claim 4,
wherein the particular condition is satisfied when a first particular condition including the code condition and a first parallel condition that is satisfied when bars of the one-dimensional barcode are approximately parallel to the second direction on the printing medium is satisfied.

Column 37, Line 22 should read:
by the second generating process, and

Signed and Sealed this
Fifteenth Day of April, 2025

Coke Morgan Stewart
*Acting Director of the United States Patent and Trademark Office*